(12) United States Patent
Xiang

(10) Patent No.: US 12,548,456 B2
(45) Date of Patent: Feb. 10, 2026

(54) METHODS AND APPARATUS FOR ENHANCING UNMANNED AERIAL VEHICLE MANAGEMENT USING A WIRELESS NETWORK

(71) Applicant: Huawei Technologies Co., Ltd., Shenzhen (CN)

(72) Inventor: Zhixian Xiang, Frisco, TX (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 439 days.

(21) Appl. No.: 17/662,300

(22) Filed: May 6, 2022

(65) Prior Publication Data

US 2022/0277657 A1 Sep. 1, 2022

Related U.S. Application Data

(63) Continuation of application No. PCT/US2020/059474, filed on Nov. 6, 2020.
(Continued)

(51) Int. Cl.
*G08G 5/55* (2025.01)
*G08G 5/26* (2025.01)
(Continued)

(52) U.S. Cl.
CPC .............. *G08G 5/55* (2025.01); *G08G 5/26* (2025.01); *G08G 5/57* (2025.01); *H04W 12/50* (2021.01);
(Continued)

(58) Field of Classification Search
None
See application file for complete search history.

(56) References Cited

U.S. PATENT DOCUMENTS

2018/0375568 A1* 12/2018 De Rosa ............ G08G 5/0034
2021/0225178 A1* 7/2021 Kusumi ............ G08G 5/0039
(Continued)

FOREIGN PATENT DOCUMENTS

WO WO-2019030425 A1 * 2/2019 ............ B64C 39/02
WO WO-2019050500 A1 * 3/2019 ........... B64C 39/024
(Continued)

OTHER PUBLICATIONS

"3rd Generation Project; Technical Specification Project; Technical Specification Group Services and System Aspects; Remote Identification of Unmanned Aerial Systems; Stage 1 (Release 16)," 3GPP TR 22.825, V16.0.0, Sep. 2018, 22 pages.
(Continued)

*Primary Examiner* — Justin S Lee
(74) *Attorney, Agent, or Firm* — Slater Matsil, LLP

(57) ABSTRACT

A method includes receiving, by an unmanned aerial system (UAS) traffic management (UTM) from a mobile network function providing UAS management support functionality, an authentication-authorization request including additional UAS management information associated with an unmanned aerial vehicle (UAV); validating, by the UTM, the authentication-authorization request thereby producing authorization data associated with the UAV; determining, by the UTM, information for UAV management including remoted identification and tracking information (RITI); and transmitting, by the UTM to the mobile network function, an authentication-authorization response including the authorization data associated with the UAV and the information for UAV management.

18 Claims, 25 Drawing Sheets

Related U.S. Application Data

(60) Provisional application No. 63/018,160, filed on Apr. 30, 2020, provisional application No. 62/986,331, filed on Mar. 6, 2020, provisional application No. 62/932,883, filed on Nov. 8, 2019.

(51) Int. Cl.
| | |
|---|---|
| *G08G 5/57* | (2025.01) |
| *H04W 12/50* | (2021.01) |
| *H04W 48/08* | (2009.01) |
| *H04W 48/16* | (2009.01) |
| *H04W 72/51* | (2023.01) |

(52) U.S. Cl.
CPC .......... *H04W 48/08* (2013.01); *H04W 48/16* (2013.01); *H04W 72/51* (2023.01)

(56) References Cited

U.S. PATENT DOCUMENTS

2021/0259045 A1* 8/2021 Prabhakar ............ G05D 1/0022
2022/0022154 A1* 1/2022 Hong .................... H04W 8/186
2022/0279355 A1* 9/2022 Roy ...................... H04W 12/08

FOREIGN PATENT DOCUMENTS

| WO | WO-2019099343 A1 * | 5/2019 | ........... G08G 5/0008 |
| WO | WO-2020200410 A1 * | 10/2020 | ........... H04L 67/125 |

OTHER PUBLICATIONS

"3rd Generation Partnership Project; Technical Specification Group Services and System Aspects; Study on supporting Unmanned Aerial Systems (UAS) connectivity, Identification and tracking (Release 17)," 3GPP TR 23.754 V0.2.0, Jun. 2020, 83 pages.

Huawei, "IDS_UAS-enhancement on initial UAV authorization operation," 3GPP TSG -SA WG1 Meeting #83, West Palm Beach, FL, Aug. 20-24, 2018, 3 pages.

* cited by examiner

METHODS AND APPARATUS FOR ENHANCING UNMANNED AERIAL VEHICLE MANAGEMENT USING A WIRELESS NETWORK

CROSS-REFERENCE TO RELATED APPLICATIONS

This application is a continuation of International Application PCT/US2020/059474 filed on Nov. 6, 2020, entitled "Methods and Apparatus for Enhancing Unmanned Aerial Vehicle Management Using a Wireless Network," which claims the benefit of U.S. Provisional Application No. 62/932,883, filed on Nov. 8, 2019, entitled "System and Method for Enhancing Unmanned Aerial Vehicle Management," U.S. Provisional Application No. 62/986,331, filed Mar. 6, 2020, entitled "Methods and Apparatus for Network-Based UAV Remote Identification and Tracking," and U.S. Provisional Application No. 63/018,160, filed Apr. 30, 2020, entitled "Method and Apparatus for Network Exposure Function Enhancement for UTM," which applications are hereby incorporated herein by reference in their entirety.

TECHNICAL FIELD

The present disclosure relates generally to methods and apparatus for digital communications, and, in particular embodiments, to methods and apparatus for enhancing unmanned aerial vehicle (UAV) management using a wireless network.

BACKGROUND

The rapid growth of the global aerial unmanned aerial vehicles (UAVs) (also commonly referred to as drones) market has made UAV management an important security and safety issue for many governments. Unsecured UAVs may pose safety and security issues to airports, hospitals, public gatherings, etc. Identifying a UAV and its controller is a key and fundamental component of UAV management.

Therefore, there is a need for methods and apparatus for enhancing UAV management using a wireless network.

SUMMARY

According to a first aspect, a method implemented by an unmanned aerial system (UAS) traffic management (UTM) is provided. The method comprising: receiving, by the UTM from a mobile network function providing UAS management support functionality, an authentication-authorization request including additional UAS management information associated with an unmanned aerial vehicle (UAV); validating, by the UTM, the authentication-authorization request thereby producing authorization data associated with the UAV; determining, by the UTM, information for UAV management including remoted identification and tracking information (RITI); and transmitting, by the UTM to the mobile network function, an authentication-authorization response including the authorization data associated with the UAV and the information for UAV management.

In a first implementation form of the method according to the first aspect, the mobile network function being implemented in one of an existing mobile network function, or a new mobile network function, to provide management support for the UAS.

In a second implementation form of the method according to the first aspect or any preceding implementation form of the first aspect, the existing mobile network function comprising one of an access management function (AMF), or a session management function (SMF).

In a third implementation form of the method according to the first aspect or any preceding implementation form of the first aspect, the new mobile network function comprising a UAV flight enablement subsystem (UFES).

In a fourth implementation form of the method according to the first aspect or any preceding implementation form of the first aspect, the information for UAV management comprising at least one of location information associated with the UAV, or other information related to the UAV in accordance with information defined in a subscription of the UAV or requested by the UTM.

In a fifth implementation form of the method according to the first aspect or any preceding implementation form of the first aspect, the other information related to the UAV being provided by a mobile network.

In a sixth implementation form of the method according to the first aspect or any preceding implementation form of the first aspect, the other information related to the UAV comprising at least one of authorization status information, policy information, pairing information associated with the UAV and associated UAV controllers (UAV-Cs), restriction information, connectivity restrictions, or connectivity requirements.

In a seventh implementation form of the method according to the first aspect or any preceding implementation form of the first aspect, the authorization data associated with the UAV comprising at least one of a result of the validating of the authentication-authorization request, operation policy related to a connection associated with the UAV management, UAV connection operation information in case the validating of the authentication-authorization request fails, an authorized area associated with the UAV, an authorized time associated with the UAV, communication capability and quality of service (QoS) requirements associated with the UAV, an indication if a UE associated with the authentication-authorization request is allowed to be used with certain UAVs, UAV connectivity behaviors usable by the mobile network, or UAV-C connectivity behaviors usable by the mobile network.

In an eighth implementation form of the method according to the first aspect or any preceding implementation form of the first aspect, the information for UAV management further compromising at least one of an assigned identity of the UAV and a UAV-C associated with the UAV, pairing information associated with the UAV and the UAV-C associated with the UAV.

In a ninth implementation form of the method according to the first aspect or any preceding implementation form of the first aspect, the pairing information comprising identifiers of the UAV and the UAV-C associated with the UAV or Internet protocol (IP) addresses of the UAV and the UAV-C associated with the UAV.

In a tenth implementation form of the method according to the first aspect or any preceding implementation form of the first aspect, the authorization data associated with the UAV and the information for UAV management being provided to the mobile network during UAV authentication and authorization, or provisioned for the UAV during UAV operation.

According to a second aspect, a method operating a mobile network function is provided. The method comprising: receiving, by the mobile network function, identification and tracking information associated with a UAV; updating, by the mobile network function, a record associated with the UAV in accordance with the identification information; and providing, by the mobile network function to a UTM function, the identification and tracking information in accordance with a request received from the UTM.

In a first implementation form of the method according to the second aspect, the mobile network function being implemented in one of an existing mobile network function, or a first new mobile network function, to provide support for a UAS.

In a second implementation form of the method according to the second aspect or any preceding implementation form of the second aspect, the record associated with the UAV being stored in a unified data management (UDM) or a second new mobile network function.

In a third implementation form of the method according to the second aspect or any preceding implementation form of the second aspect, the identification information comprising a UAV identifier.

In a fourth implementation form of the method according to the second aspect or any preceding implementation form of the second aspect, the identification information comprising a mobile network identifier associated with the UAV.

In a fifth implementation form of the method according to the second aspect or any preceding implementation form of the second aspect, updating the record associated with the UAV comprising updating a mapping between identifiers associated with the UAV.

In a sixth implementation form of the method according to the second aspect or any preceding implementation form of the second aspect, the mobile network function comprising a UAS network publishing function (UNPF).

In a seventh implementation form of the method according to the second aspect or any preceding implementation form of the second aspect, the UNPF being implemented as a UAV flight enablement subsystem (UFES).

In an eighth implementation form of the method according to the second aspect or any preceding implementation form of the second aspect, the identification and tracking information associated with the UAV being received a dedicated UTM container containing UAV information being transferred between the UAV and the mobile network function and the UTM using a 3GPP defined protocol.

In a ninth implementation form of the method according to the second aspect or any preceding implementation form of the second aspect, the 3GPP defined protocol comprising a network access stratum (NAS) message.

In a tenth implementation form of the method according to the second aspect or any preceding implementation form of the second aspect, the identification and tracking information comprising location information of the UAV.

In an eleventh implementation form of the method according to the second aspect or any preceding implementation form of the second aspect, the identification and tracking information associated with the UAV being received from a second mobile network function in accordance with a request made by the mobile network function.

In a twelfth implementation form of the method according to the second aspect or any preceding implementation form of the second aspect, the second mobile network function comprising a location base function or an access management function (AMF).

According to a third aspect, a UTM is provided. The UTM comprising: one or more processors; and a non-transitory memory storage comprising instructions that, when executed by the one or more processors, cause the UTM to: receive, from a mobile network function providing UAS management support functionality, an authentication-authorization request including additional UAS management information associated with a UAV; validate the authentication-authorization request thereby producing authorization data associated with the UAV; determine information for UAV management including RITI; and transmit, to the mobile network function, an authentication-authorization response including the authorization data associated with the UAV and the information for UAV management.

In a first implementation form of the UTM according to the third aspect, the information for UAV management comprising at least one of location information associated with the UAV, or other information related to the UAV in accordance with information defined in a subscription of the UAV or requested by the UTM.

In a second implementation form of the UTM according to the third aspect or any preceding implementation form of the third aspect, the other information related to the UAV comprising at least one of authorization status information, policy information, pairing information associated with the UAV and associated UAV-Cs, restriction information, connectivity restrictions, or connectivity requirements.

In a third implementation form of the UTM according to the third aspect or any preceding implementation form of the third aspect, the authorization data associated with the UAV comprising at least one of a result of the authentication-authorization request validation, operation policy related to a connection associated with the UAV management, UAV connection operation information in case the authentication-authorization request validation fails, an authorized area associated with the UAV, an authorized time associated with the UAV, communication capability and quality of service (QoS) requirements associated with the UAV, an indication if a UE associated with the authentication-authorization request is allowed to be used with certain UAVs, UAV connectivity behaviors usable by a mobile network, or UAV-C connectivity behaviors usable by the mobile network.

In a fourth implementation form of the UTM according to the third aspect or any preceding implementation form of the third aspect, the information for UAV management further comprising at least one of an assigned identity of the UAV and a UAV-C associated with the UAV, pairing information associated with the UAV and the UAV-C associated with the UAV.

In a fifth implementation form of the UTM according to the third aspect or any preceding implementation form of the third aspect, the authorization data associated with the UAV and the information for UAV management being provided to the mobile network during UAV authentication and authorization, or provisioned for the UAV during UAV operation.

According to a fourth aspect, a mobile network function is provided. The mobile network function comprising: one or more processors; and a non-transitory memory storage comprising instructions that, when executed by the one or more processors, cause the mobile network function to: receive identification and tracking information associated with a UAV; update a record associated with the UAV in accordance with the identification information; and provide, to a UTM function, the identification and tracking information in accordance with a request received from the UTM.

In a first implementation form of the mobile network function according to the fourth aspect, the mobile network function being implemented in one of an existing mobile network function, or a first new mobile network function, to provide support for a UAS.

In a second implementation form of the mobile network function according to the fourth aspect or any preceding implementation form of the fourth aspect, the record associated with the UAV being stored in a UDM or a second new mobile network function.

In a third implementation form of the mobile network function according to the fourth aspect or any preceding implementation form of the fourth aspect, the identification information comprising a UAV identifier or a mobile network identifier associated with the UAV.

In a fourth implementation form of the mobile network function according to the fourth aspect or any preceding implementation form of the fourth aspect, the identification and tracking information associated with the UAV being received a dedicated UTM container containing UAV information being transferred between the UAV and the mobile network function and the UTM using a 3GPP defined protocol.

An advantage of a preferred embodiment is that enhancements are made to wireless networks (such as 3GPP networks) to enable UAV connectivity management by the wireless networks.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The structure and use of disclosed embodiments are discussed in detail below. It should be appreciated, however, that the present disclosure provides many applicable concepts that can be embodied in a wide variety of specific contexts. The specific embodiments discussed are merely illustrative of specific structure and use of embodiments, and do not limit the scope of the disclosure.

Figure 1:
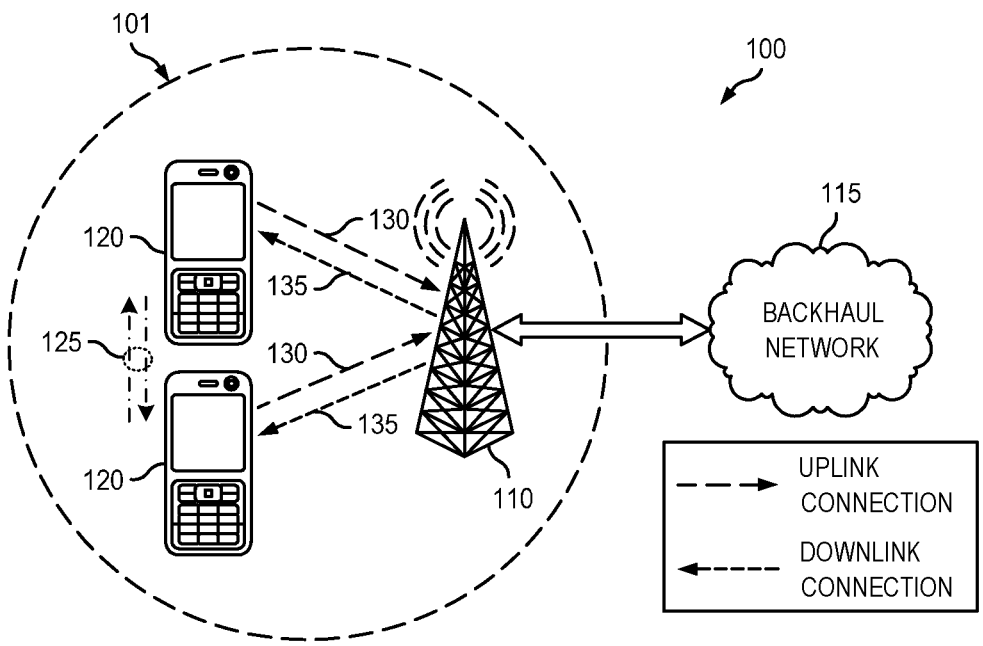
FIG. 1 illustrates a first example communications system.

FIG. 1 illustrates a first example communications system 10o. Communications system 100 includes an access node 110, with coverage area 101, serving user equipments (UEs), such as UEs 120. Access node 110 is connected to a backhaul network 115 that provides connectivity to services and the Internet. In a first operating mode, communications to and from a UE passes through access node 110. In a second operating mode, communications to and from a UE do not pass through access node 110, however, access node 110 typically allocates resources used by the UE to communicate when specific conditions are met. Communication between a UE pair in the second operating mode occurs over sidelinks 125, comprising uni-directional communication links. Communication between a UE and access node pair also occur over uni-directional communication links, where the communication links between the UE and the access node are referred to as uplinks 13o, and the communication links between the access node and UE is referred to as downlinks 135.

Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, sixth generation (6G), High Speed Packet Access (HSPA), the IEEE 802.11 family of standards, such as 802.11a/b/g/n/ac/ad/ax/ay/be, etc. While it is understood that communications systems may employ multiple access nodes capable of communicating with a number of UEs, only one access node and two UEs are illustrated for simplicity.

Figure 2:
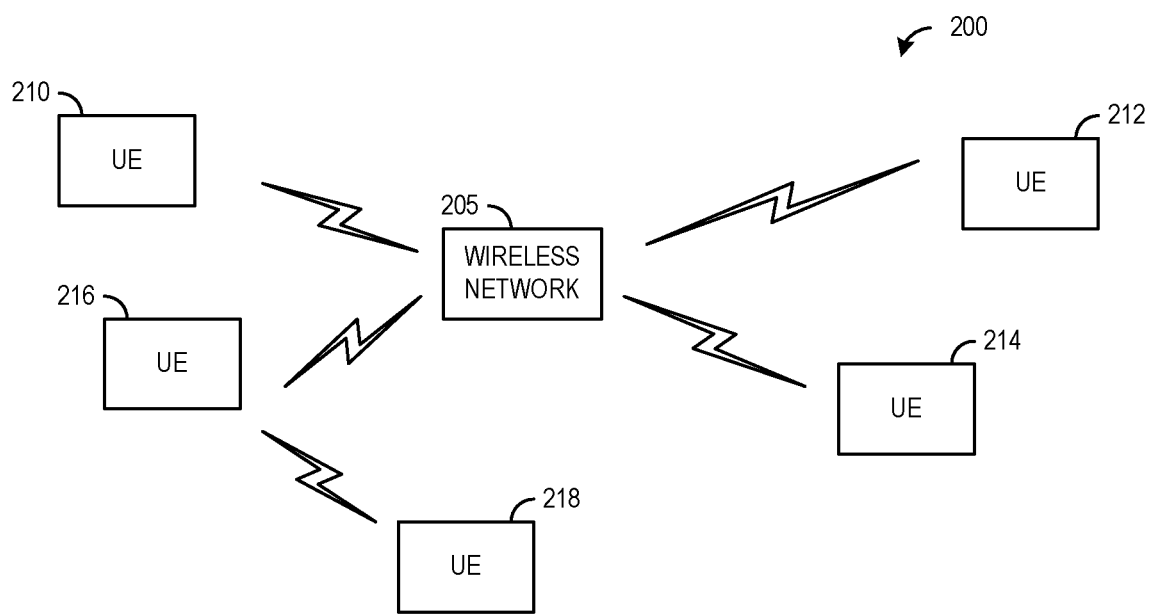
FIG. 2 illustrates a second example wireless communications system.

FIG. 2 illustrates a second example wireless communications system 200. Communications system 200 includes a wireless network 205 serving user equipments (UEs), such as UEs 210, 212, 214, 216, and 218. In a first operating mode, communications to and from a UE passes through wireless network 205. In a second operating mode, communications to and from a UE do not pass through wireless network 205, however, wireless network 205 typically maintains control of resources used by the UE to communicate when specific conditions are met. Wireless network 205 may include access nodes, core network entities, network functions, etc.

The rapid growth in unmanned aerial vehicle (UAV) growth has led to an urgent need in establishing a safe operating environment for all users, both manned and unmanned. Airports, cities, police, and users, all need to be able to easily and efficiently manage UAVs within their airspace.

Cellular networks, such as the 3GPP LTE compliant cellular networks, offer the benefit of long range reliability, secured connections, and a mature identifier (ID) management process. Because of these advantages, cellular networks and the attendant ID management process is becoming an attractive solution for UAV management. Many global mobile network operators are working in cooperation with governmental regulators to promote the utilization of 3GPP ID management and authentication-authorization processes for UAV management. 3GPP ID management and authentication-authorization processes may be used for UAV and controller authentication-authentication, for example.

Figure 3:
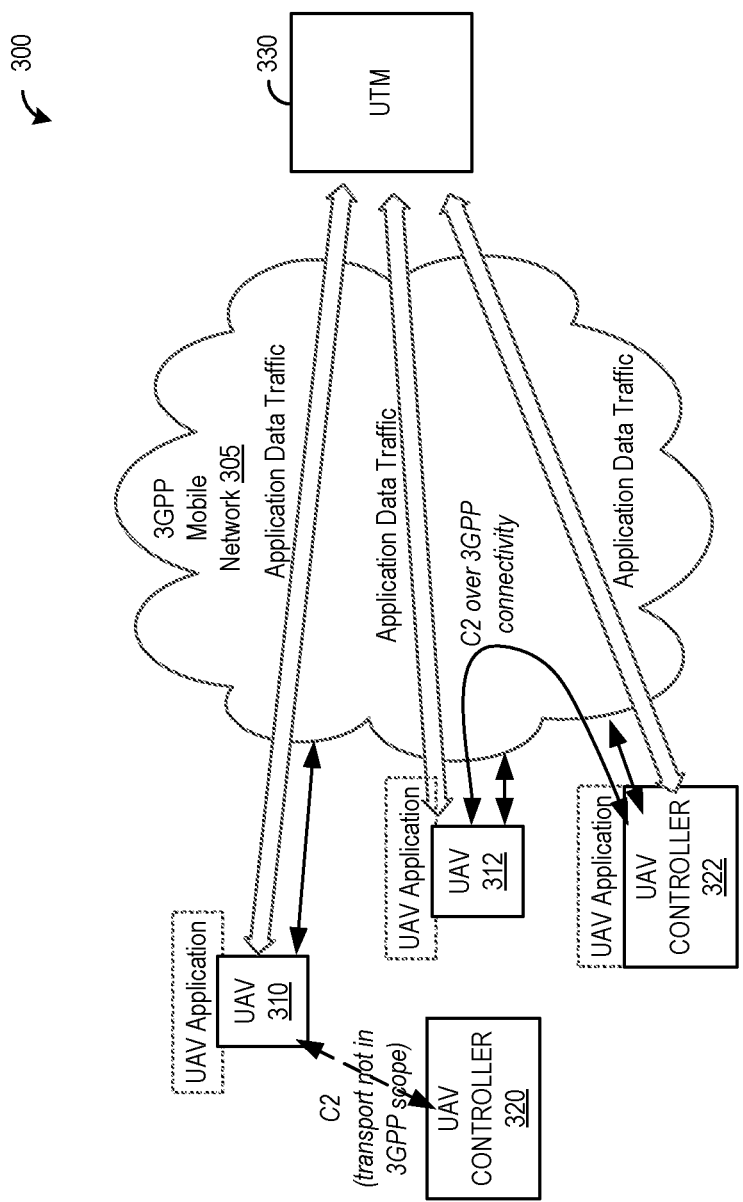
FIG. 3 illustrates an example communications system with support for unmanned aerial vehicles (UAVs) and UAV controllers (UAV-Cs)

FIG. 3 illustrates an example communications system 300 with support for UAVs and UAV controllers (UAV-Cs). Communications system 300 includes a 3GPP mobile network 305. 3GPP mobile network 305 provides connectivity for UAVs, such as UAV 310 and UAV 312, and UAV-Cs, such as UAV-C 320 and UAV-C 322. Connectivity between a UAV and its UAV-C may be through a C2 connection, such as between UAV 310 and UAV-C 320, or through 3GPP mobile network 305, such as between UAV 312 and UAV-C 322.

Furthermore, 3GPP mobile network 305 provides connectivity for support of application data traffic for the UAVs. The application data traffic may flow through 3GPP mobile network 305, independent of the connection between the UAV and its UAV controller. Communications system 300 also includes an unmanned traffic management (UTM) system 330 that manages UAV traffic.

This has resulted in establishment of a work item (WI) in 3GPP related to UAV management. The focus of the 3GPP WI is to permit an UTM system to provide UAV and the information of the UAV's controller to the 3GPP network. Furthermore, in order to enable the 3GPP network to provide improved assistance in UAV management, the UAV and its controller are to be identified as a special type of UE.

Figure 4:
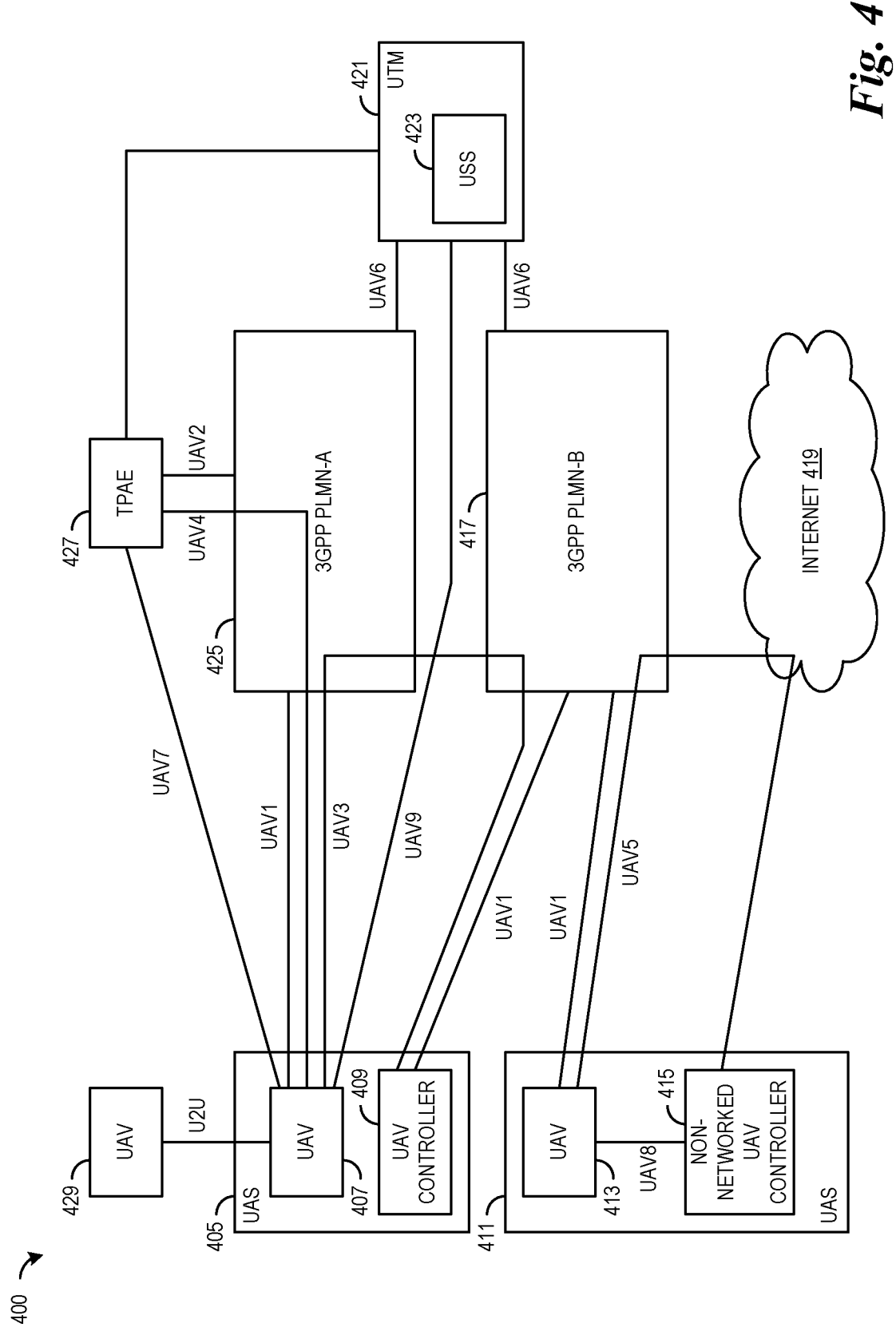
FIG. 4 illustrates a high-level view of a communication system with support for unmanned aerial systems (UASs) according to example embodiments presented herein.

FIG. 4 illustrates a high-level view of a communication system 400 with support for unmanned aerial systems (UASs). Communication system 400 includes a first type of UAS 405 where a UAV 407 and its UAV-C 409 communicate through a C2 connection. Communication system 400 also includes a second type of UAS 411 where a UAV 413 and its UAV-C 415 communicate through a 3GPP public land mobile network (PLMN) 417 and Internet 419. A UAV 429 communicates with UAV 407 and may be controlled by UAV-C 409 through UAV 407.

Communication system 400 also includes a UAS traffic management (UTM) 421 configured to manage UAV traffic. UTM 421 includes a UAV service supplier (USS) 423 that provides UAV services to UAVs. UTM 421 is connected to the UASs by PLMNs, such as PLMN 417 and PLMN 425. A third party authorized entity (TPAE) 427 may be an entity that is capable of obtaining information on UAVs.

Furthermore, a special use case for 3GPP SA1 UAV controller change has been introduced. In such a controller change, after a UAV and the UAV controller have set up an association and have initiated a flight task, a C2 link is established. The C2 link supports unmanned aircraft systems (UAS) operation. In some situations, such as a UAV flying beyond the line of sight of its operator or in an emergency event, the UAV controller may be taken over by another UAV controller or a higher priority UAV controller. In such a situation, the C2 link will be set up with the new UAV controller to ensure that continuous support for the flight task is provided. In addition, some process optimization may be considered according to the UTM and the operator's policy.

In current 3GPP systems, the authentication and authorization of the UAV and the UAV controller for initial connection is considered. However, they are considered as individual UE authentication and authorization without linking the UAV and the UAV controller together. From a regulatory prospective, the UAV and the UAV controller should be linked together. Furthermore, in a situation where a UAV controller changes, the authentication and authorization of the new UAV controller should also be considered.

According to an example embodiment, an authentication and authorization mechanism for pairing a UAV and a UAV controller is provided. The authentication and authorization mechanism uses stored pairing information, e.g., a UAV and UAV controller pairing information, to enable fast UAV and UAV controller pairing. In an embodiment, the stored pairing information comprises UAV controller identity information, and UAV information associated with each UAV controller identity.

As an example, the stored pairing information may comprise one or more UAV controller identities, and for each UAV controller identity, a list of UAV identities that can connect to and be controlled by the UAV controller identity. As an example, the stored pairing information may comprise one or more UAV controller identities, and for each UAV controller identity, a list of UAV identities that cannot connect to and be controlled by the UAV controller identity. As an example, the stored pairing information may comprise one or more UAV controller identities, and for each UAV controller identity, a list of UAV identities that can connect to and be controlled by the UAV controller identity, as well as a list of UAV identities that cannot connect to and be controlled by the UAV controller identity.

The stored pairing information may be stored in tabular format, for example. In an embodiment, a network entity uses the stored pairing information to authenticate and authorize a new UAV controller for the UAV. In an embodiment, the stored pairing information is stored at a UTM, a network entity of the 3GPP mobile network responsible for authentication and authorization as part of UAV's subscription information. In an embodiment, the stored pairing information is provided by the UAV to the UTM.

According to an example embodiment, criteria for UAV controller location or placement are provided to assist the 3GPP mobile network or the UTM to select a suitable UAV controller. As an example, location information, local restrictions, network connectivity status, operator qualification, and so forth, are used to help select a suitable UAV controller. The 3GPP mobile network may also consider these criteria for UAV controller authentication. These criteria may be stored in association with the UAV's subscription information.

In an embodiment, the stored pairing information, which may be stored in tabular form, includes a list of eligible UAV controllers allowed to control one or one set of UAV(s). The stored pairing information may include a UAV controller identifier (such as a physical identifier, a media access control (MAC) identifier, an Internet Protocol (IP) address, and so on), as well as a UAV type. Additional stored pairing information may include a list of UAV identifiers that a UAV controller is allowed to control.

In an embodiment, the stored pairing information may be preconfigured and stored as part of a UAV's subscription. Alternatively, the stored pairing information may be stored in the UAVs and forwarded to the 3GPP mobile network during or after 3GPP authentication and authorization. The stored pairing information may modified by a UE, a UTM, or an operator of the 3GPP mobile network.

In an embodiment, if a new UAV controller has already connected via the 3GPP mobile network, then when a UAV or the new UAV controller requests authorization from the 3GPP mobile network to pair and connect the UAV and the new UAV controller together, the network entity of the 3GPP mobile network responsible for authentication and authorization will parse the stored pairing information to determine if the new UAV controller is permitted to connect to and control the UAV. If the new UAV controller is permitted to connect to and control the UAV, the 3GPP mobile network connects the UAV and the new UAV controller. Otherwise, the 3GPP mobile network rejects the request.

In an embodiment, if the new UAV controller has not connected to the 3GPP mobile network, then when during an initial 3GPP mobile network access authentication and authorization process, the new UAV controller will provide a UAV identifier of a UAV that the UAV controller intends to control in an authentication and authorization request message. If the new UAV controller is matched with the UAV in the stored pairing information, the new UAV controller will be authorized to connect to and control the UAV. Otherwise, the authentication and authorization request is rejected.

Due to the nature of the UAS traffic management, not all UAV controllers are suitable for controlling all UAVs. Therefore, the authenticity of a UAV controller is not all that is considered for the authentication and authorization process. Additional authentication and authorization factors that should be considered prior to authorizing a new UAV controller to connect to and control a UAV include:

Location restrictions: allow only UAV controllers within a certain geographic location or certain 3GPP network cell to connect to and control a UAV;

Distance to UAV: the UAV controller should be within a specified distance away from the UAV. The position of the UAV controller, along with the UAV position, is used to determine the distance to the UAV;

UAV controller type;

A number of UAVs the UAV controller is connected to and controlling;

Network connection status of the UAV controller, including network performance information and measurements;

Human operator identification: the identity of the operator of the UAV controller.

In an embodiment, the additional authentication and authorization factors may part of the subscription information of the UAV and the UAV controller. The additional authentication and authorization factors may be stored in the 3GPP mobile network. Alternatively, the additional authentication and authorization factors may be provided by the UTM to the 3GPP mobile network. Alternatively, the additional authentication and authorization factors may be preconfigured in the network entity of the 3GPP mobile network responsible for authentication and authorization for UTM authentication and authorization purposes.

In an embodiment, when the UAV controller is participating in a 3GPP mobile network access authentication and authorization process, the UAV controller presents the additional authentication and authorization factors, along with information of the UAV (such as UAV identifier, etc.) that the UAV controller intends to connect to and control. In an embodiment, the additional authentication and authorization factors provided by the UAV controller may differ depending on the information already in UTM and 3GPP mobile network policy.

According to an example embodiment, a pre-authentication and authorization mechanism for UAV controller for fast UAV controller to UAV pairing is provided. A UAV (or UTM or 3GPP mobile network) may be able to predict when a UAV controller change is needed. As an example, the UAV is moving out of range of the UAV controller. As another example, the connection quality of the UAV controller is dropping. The prediction may be based on a quality of service (QoS) predictive mechanism or the UAV's planned or estimated path.

In an embodiment, the UAV (or UTM or 3GPP mobile network) triggers a process to prepare for a new UAV controller to connect to and control the UAV. If a suitable new UAV controller is already connected to the 3GPP mobile network, the 3GPP mobile network or the UTM may trigger a UAV controller authorization procedure to authorize the new UAV controller to connect to and control the UAV. After successful authorization, a new connection may be established for the UAV. A time-out timer may also be started. If the time-out timer expires prior to the completion of the pairing of the UAV and the new UAV controller, the new connection is torn down, for example. A notification may be sent to the UAV.

When the UAV is read to connect to and pair with the new UAV controller, the 3GPP mobile network pairs the connection between the UAV and the new UAV controller. The 3GPP mobile network may then tear down the connection between the UAV and the old UAV controller.

In a situation when the UTM is conducting the authorization and authentication of the new UAV controller, the UTM may be able to interact with the 3GPP mobile network to inquire about the connection status of the new UAV controller. The information regarding the connection status of the new UAV controller may be used to select a suitable new UAV controller for the UAV. A new 3GPP application programming interface (API) may be needed to support this.

In an embodiment, an indication sent during the authentication and authorization process indicates if the authentication and authorization request is initiated and authorized by the UTM prior to completion of the 3GPP authentication process. Therefore, if the 3GPP authentication process is successful, no further authentication with the UTM is needed. Thereby speeding up the process. The indication may be sent by the UAV or the new UAV controller.

Figure 5:
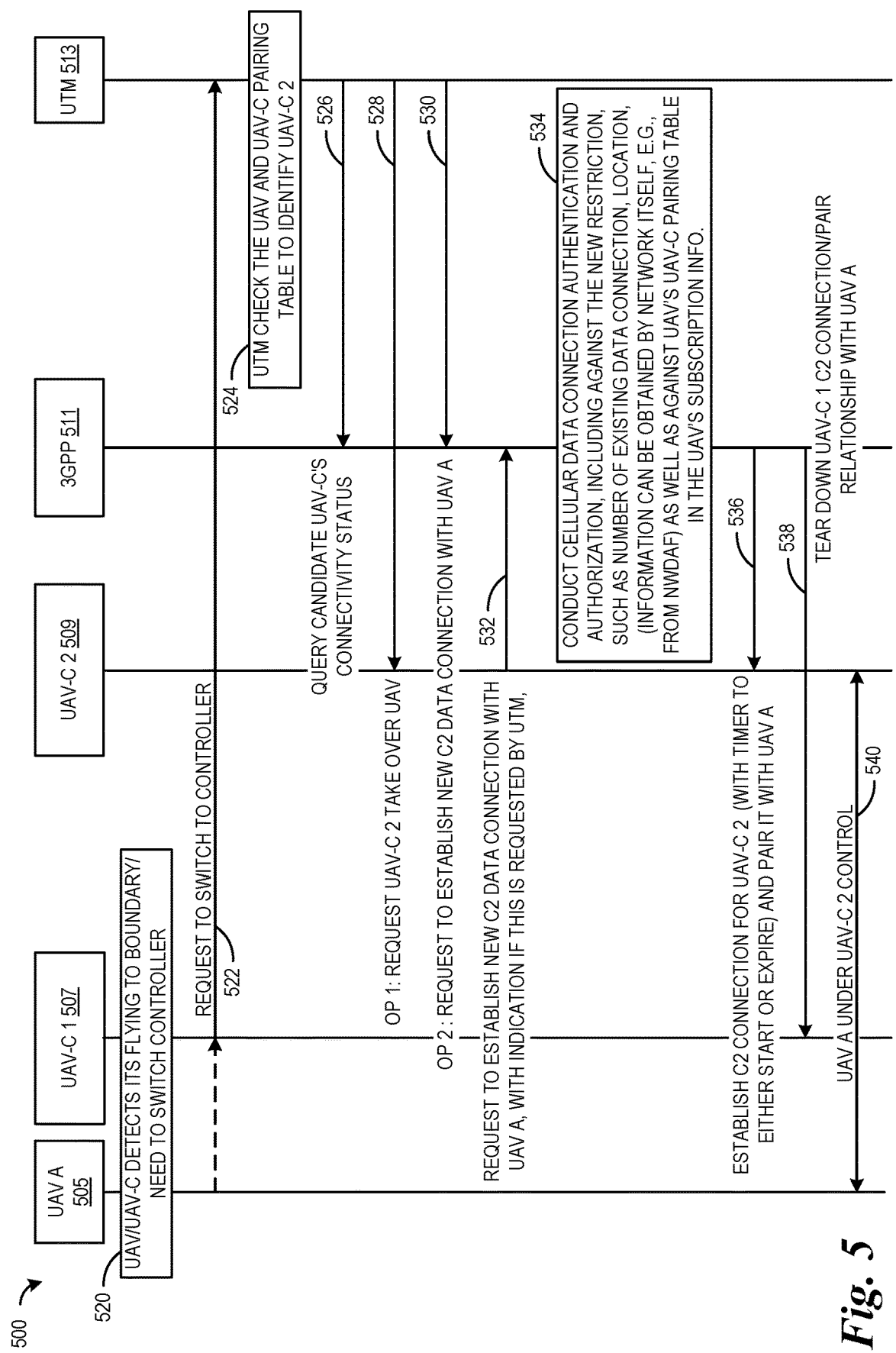
FIG. 5 illustrates a diagram highlighting messages exchanged and processing performed during a UAV-C switching process where the unmanned traffic management (UTM) authorizes the UAV-C switch before the 3GPP authentication process completes according to example embodiments presented herein.

FIG. 5 illustrates a diagram 500 highlighting messages exchanged and processing performed during a UAV-C switching process where the UTM authorizes the UAV-C switch before the 3GPP authentication process completes. The messages exchange and processing performed involve a UAV A 505, a UAV-C 1507, a UAV-C 2509, a 3GPP network entity 511, and a UTM 513.

UAV A 505 or UAV-C 1507 (which is controlling UAV A 505) detects that UAV A 505 is flying towards a boundary of the coverage area of UAV-C 1507 (block 520). As a result, UAV A 505 should switch UAV-C to ensure that UAV A 505 remains under control of a UAV-C. UAV-C 1 507 transmits a request to switch UAV-C of UAV A 505 (event 522). The request to switch UAV-C may be sent to UTM 513. UTM 513 parses the UAV-to-UAV-C pairing table to identify an alternate UAV-C, e.g., UAV-C 2509, for UAV A 505 (block 524).

UTM 513 queries the connectivity status of UAV-C 2509 (event 526). The query may be performed by transmitting the query to 3GPP network entity 511. UTM 513 may either directly request UAV-C 2509 to take over control of UAV A 505, over a C2 connection, for example (event 528) or request UAV-C 2509 to establish a C2 data connection with UAV A 505, by transmitting a request to 3GPP network entity 511, for example (event 53o). In the case where UTM 513 requests UAV-C 2509 to establish a C2 data connection with UAV A 505, UAV-C 2 509 sends a request to 3GPP network entity 511 to establish the C2 data connection (event 532).

3GPP network entity 511 conducts a cellular data connection authentication-authorization process (block 534). The authentication-authorization process may include, comparisons with new restrictions, including number of existing data connections, location (such as information obtainable by 3GPP network entity 511 itself (e.g., a network data analytics function (NWDAF)), as well as comparisons with a UAV-C pairing table in the subscription information of UAV A 505.

3GPP network entity 511 establishes the C2 connection for UAV-C 2509 (event 536). The C2 connection may include a timer associated with the start of the C2 connection or the expiration of the C2 connection. The C2 connection may be paired with UAV A 505. 3GPP network entity 511 tears down the C2 connection between UAV A 505 and UAV-C 1507 (event 538). Additionally, the pairing relationship between UAV A 505 and UAV-C 1507 may be eliminated.

Figure 6:
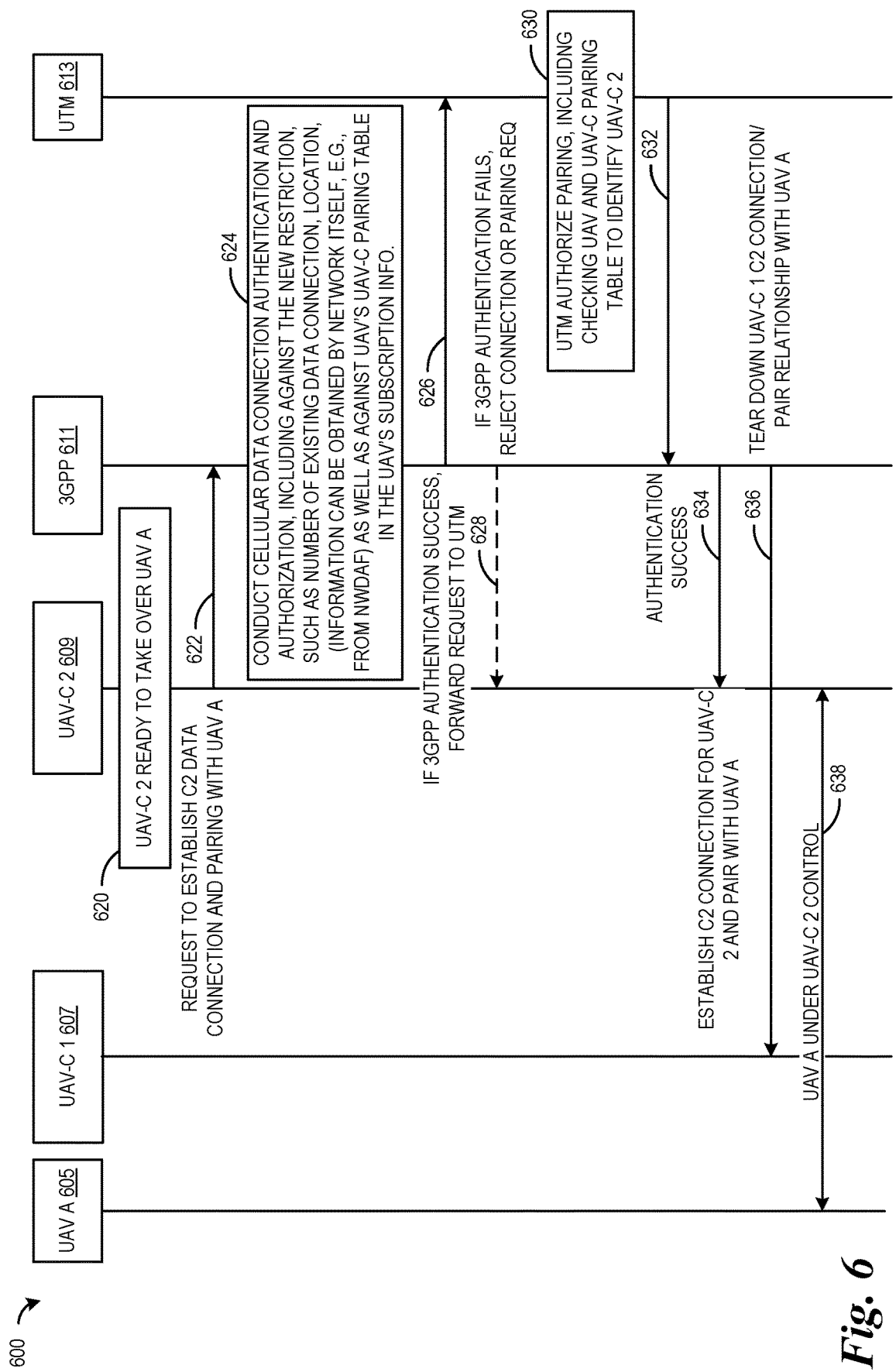
FIG. 6 illustrates a diagram highlighting messages exchanged and processing performed during a UAV-C switching process where the UTM authorizes the UAV-C switch after the 3GPP authentication process completes according to example embodiments presented herein.

FIG. 6 illustrates a diagram 600 highlighting messages exchanged and processing performed during a UAV-C switching process where the UTM authorizes the UAV-C switch after the 3GPP authentication process completes. The messages exchange and processing performed involve a UAV A 605, a UAV-C 1607, a UAV-C 2 609, a 3GPP network entity 611, and a UTM 613.

UAV-C 2 609 determines that it is ready to take over the control of UAV A 605 (block 620). UAV-C 2609 may detect that UAV A 605, for example, or UAV-C 2609 receives a transmission from UTM 613 requesting that UAV-C 609 take over control of UAV A 60, for example. UAV-C 2609 transmits a request to 3GPP network entity 611 to establish a C2 data connection with UAV A 605 and to pair with UAV A 605 (event 622).

3GPP network entity 611 conducts a cellular data connection authentication-authorization process (block 624). The authentication-authorization process may include, comparisons with new restrictions, including number of existing data connections, location (such as information obtainable by 3GPP network entity 611 itself (e.g., a network data analytics function (NWDAF)), as well as comparisons with a UAV-C pairing table in the subscription information of UAV A 605.

If the authentication-authorization process completes successfully, 3GPP network entity 626 forwards the request that UAV-C 609 take over control of UAV A 605 to UTM 613 (event 626). If the authentication-authorization process does not complete successfully, 3GPP network entity 611 rejects the request (event 628).

UTM 613 authorizes the pairing (block 630). The authorization of the pairing between UAV-C 2609 and UAV A 605 includes checking the UAV-to-UAV-C pairing table to identify UAV-C 2 609, for example. UTM 613 sends an authentication success message to 3GPP network entity 611 (event 632). 3GPP network entity 611 establishes the C2 connection for UAV-C 2 609 and UAV A 605 (event 634). 3GPP network entity 611 tears down the C2 connection and the pair relationship for UAV-C 1607 and UAV A 605 (event 636). UAV A 605 is now under control of UAV-C 2 609 (event 638).

Figure 7:
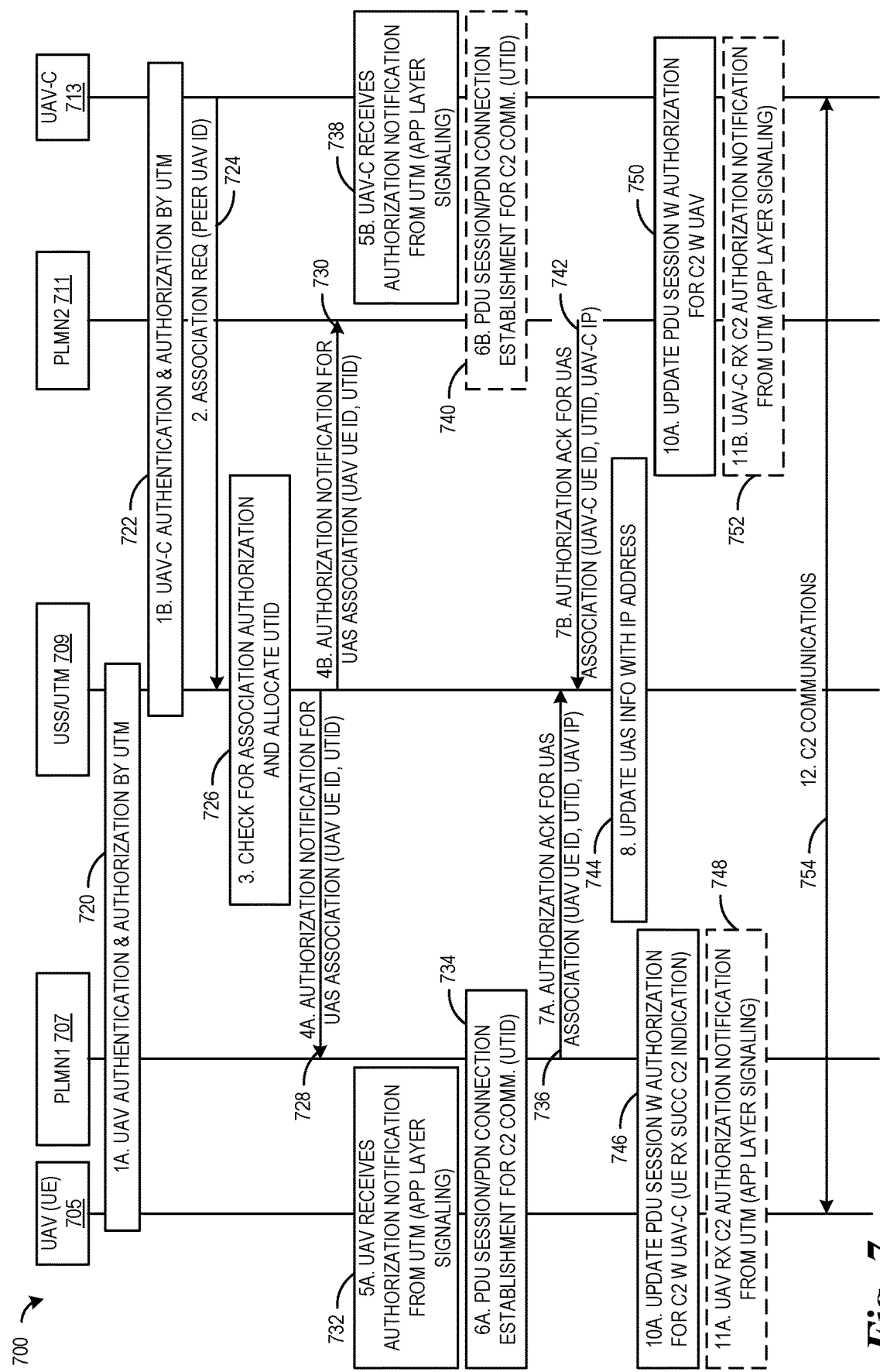
FIG. 7 illustrates a diagram highlighting messages exchanged and processing performed during the establishment of a C2 connection between a UAV and a UAV-C according to example embodiments presented herein.

FIG. 7 illustrates a diagram 700 highlighting messages exchanged and processing performed during the establishment of a C2 connection between a UAV and a UAV-C. The messages exchange and processing performed involve a UAV 705, a PLMN 1707, a USS/UTM 709, a PLMN 2 711, and a UAV-C 713.

An authentication-authorization process is performed for UAV 705 by USS/UTM 709 (block 720). The authentication-authorization process takes place by exchanging messages over PLMN 1707. Similarly, an authentication-authorization process is performed for UAV-C 713 by USS/UTM 709 (block 722). The authentication-authorization process also takes place by exchanging messages over PLMN 2711.

UAV-C 713 transmits an association request (event 724). The association request may include a peer UAV identifier, for example. USS/UTM 709 performs a check for association authorization, and if authorized, allocates a UAS temporary ID (UTID) (block 728). USS/UTM 709 transmits an authorization notification for the UAS association to both PLMNs (events 728 and 730). The authorization notification may include the UAV ID and the UTID, for example. The PLMNs forward the authorization notifications to UAV 705 and UAV-C 713.

UAV 705 receives the authorization notification from USS/UTM 709 (block 732). As an example, the authorization notification is received in application layer signaling. UAV 705 and PLMN 1707 participate in establishing a protocol data unit (PDU) session and packet data network (PDN) connection for the C2 connection (block 734). The establishment of the PDU session and PDN connection utilize the UTID, for example. PLMN 1707 transmits an authorization acknowledgement for the UAS association (event 736). The authorization acknowledgment may include the UAV ID and the Internet protocol (IP) address of the UAV, for example.

UAV-C 713 receives the authorization notification from USS/UTM 709 (block 738). As an example, the authorization notification is received in application layer signaling. UAV-C 713 and PLMN 2 711 may participate in establishing a PDU session and a PDN connection for the C2 connection (block 740). The establishment of the PDU session and the PDN connection utilize the UTID, for example. PLMN 2 711 transmits an authorization acknowledgement for the UAS association (event 742). The authorization acknowledgment may include the UAV-C ID, the UTID, and the IP address of the UAV-C, for example.

USS/UTM 709 updates the UAS information with the IP address of UAV 705 and UAV-C 713 (block 744). UAV 705 and PLMN 1707 update the PDU session with the authorization for the C2 connection with the UAV-C (block 746). This may occur after UAV 705 receives a successful C2 connection indication, for example. UAV 705 may receive the successful C2 connection indication (block 748). The successful C2 connection indication may be received from USS/UTM 709 in application layer signaling, for example. UAV-C 713 and PLMN 2711 update the PDU session with the authorization for the C2 connection with the UAV (block 750). This may occur after UAV-C 713 receives a successful C2 connection indication, for example. UAV-C 713 may receive the successful C2 connection indication (block 752). The successful C2 connection indication may be received from USS/UTM 709 in application layer signaling, for example. UAV-C 713 and UAV 705 communicate using C2 communications (event 754).

Figure 8A:
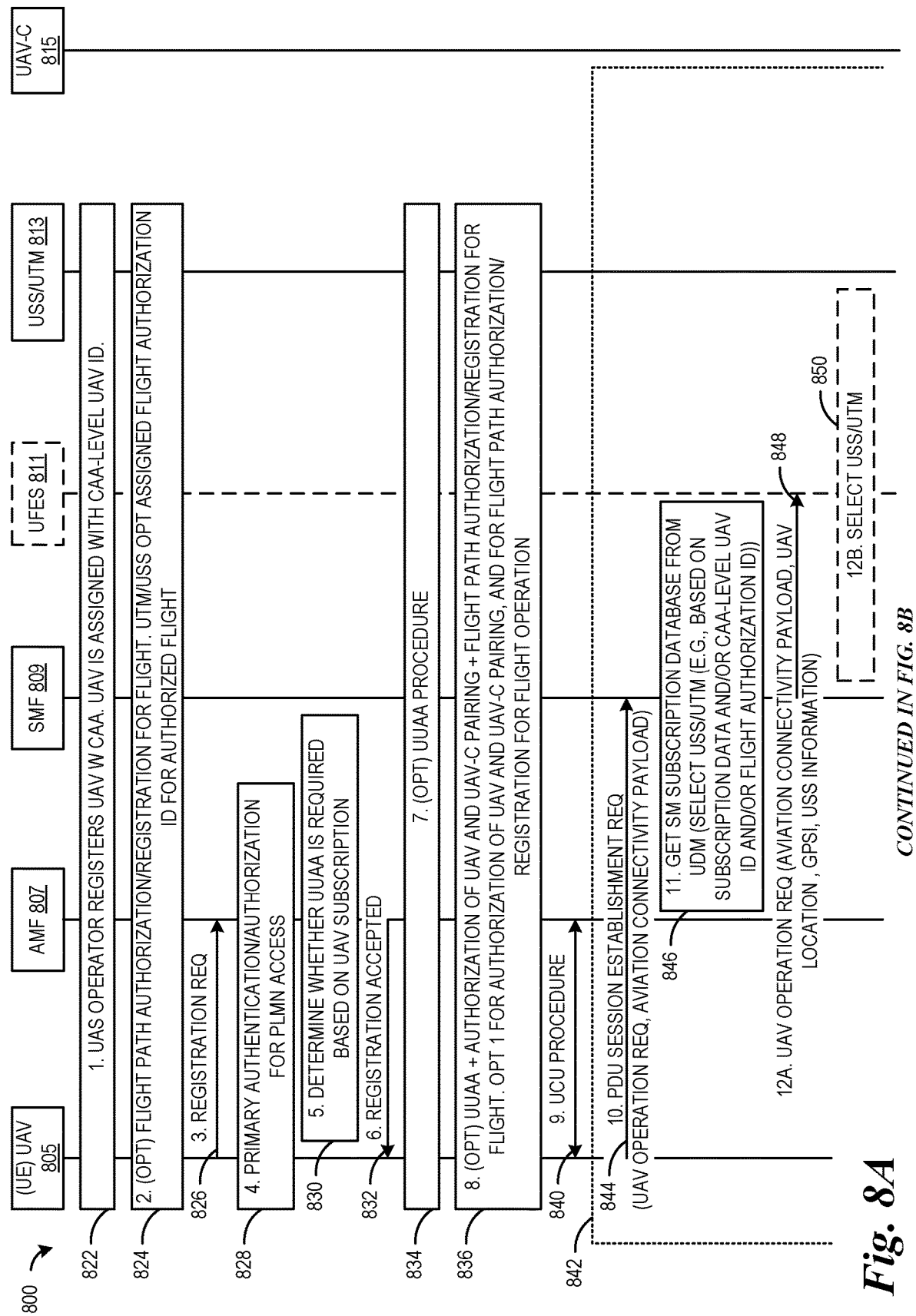
FIGS. 8A and 8B illustrate a diagram highlighting messages exchanged and processing performed in the establishment of a connection between a UAV and a UAV-C according to example embodiments presented herein.
Figure 8B:
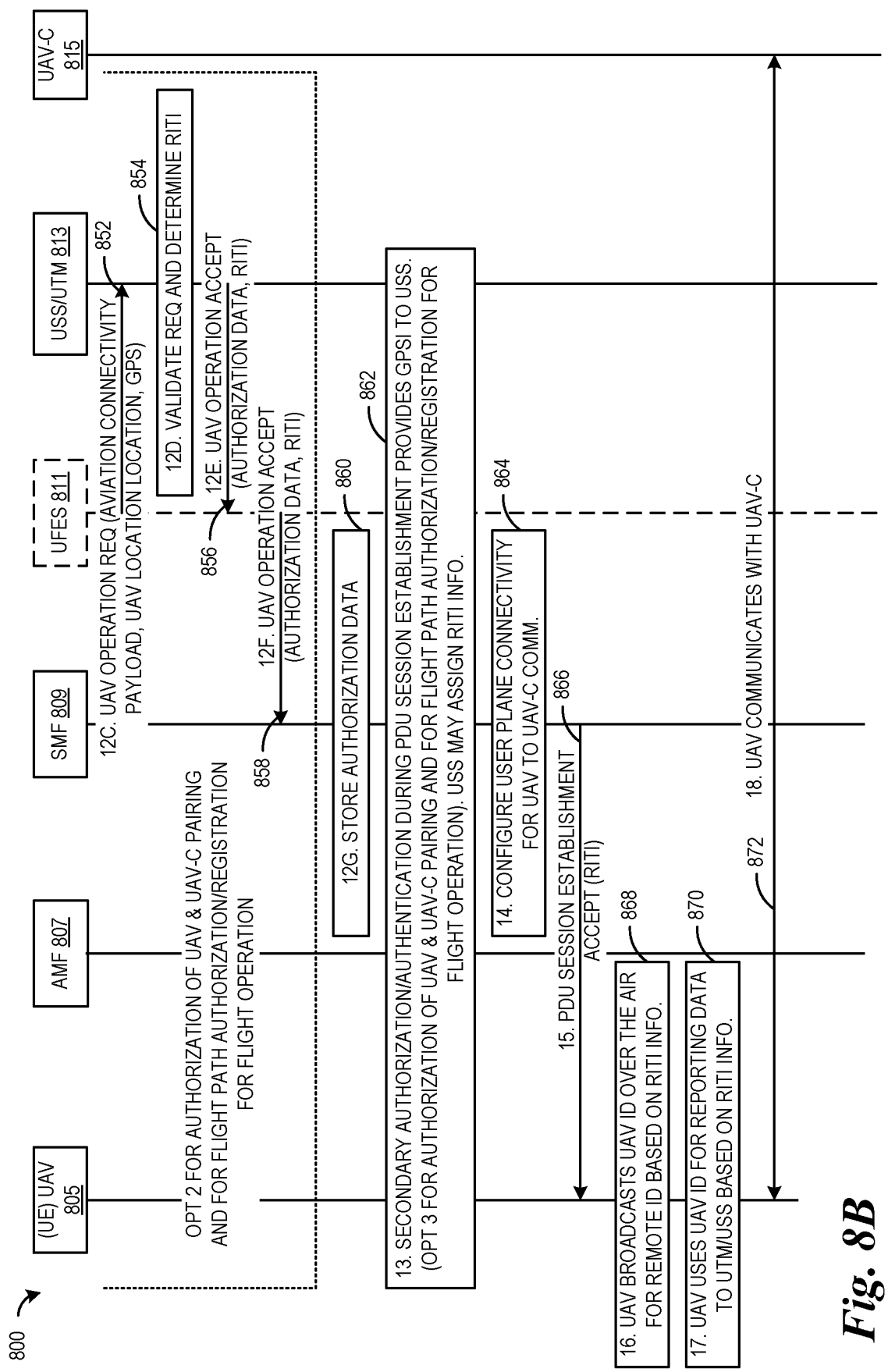

FIGS. 8A and 8B illustrate a diagram 80*o* highlighting messages exchanged and processing performed in the establishment of a connection between a UAV and a UAV-C. The messages exchanged and processing performed involve a UAV 805, an access and mobility management function (AMF) 807, a SMF 809, a UFES 811, and a USS/UTM 813.

UAV 805 registers, using UAS operator, with certificate authority authorization (CAA) (block 822). Registration results in UAV 805 being assigned a CAA-level UAV ID. Optionally, flight path authorization and registration for flight purposes is performed (block 824). USS/UTM 813 is optionally assigned a flight authorization ID for authorized flight purposes.

UAV 805 transmits a registration request (event 826). The registration request may be transmitted to AMF 807, for example. UAV 805 and AMF 807 participate in primary authentication and authorization for purposes of PLMN access (block 830). AMF 807 performs a check to determine if USS UAV authorization-authentication (UUAA) is needed (block 832). The determination of the need for UUAA is in accordance with the subscription of UAV 805, for example. After registration completes, AMF 807 transmits a registration accepted (block 832). AMF 807 transmits the registration accepted message to UAV 805 after registration completes successfully.

Optionally, the UUAA procedure is performed (block 834). The UUAA procedure is performed if UUAA is needed (based on the subscription of UAV 805). Optionally, UUAA, authorization of the pairing of UAV 805 and a UAV-C of UAV 805, and flight path authorization and registration is performed (block 836). UAV 805 and AMF 807 perform a UE configuration update (UCU) procedure (event 84*o*). The UCU procedure may update the configuration based on the changes associated with the registration of UAV 805.

The devices participate in an optional process involving the authorization of UAV and UAV-C pairing, as well as for flight path authorization and registration for flight operation (dotted box 842). The optional process includes UAV 805 transmitting a PDU session establishment request (event 844). The PDU session establishment request may be transmitted to SMF 809, and may include UAV operation request, and aviation connectivity payload. SMF 809 obtains a short message (SM) subscription database from a unified data management (UDM) (block 846). As an example, a USS/UTM is selected, where the selection is based on subscription data or CAA-level UAV ID or flight authorization ID. SMF 809 transmits a UAV operation request (event 848). The UAV operation request may be transmitted to UFES 811, and may include aviation connectivity payload, UAV location, GPSI, USS information, etc. UFES 811 optionally selects the USS/UTM (block 850). UFES 811 selects the USS/UTM if one is not already selected.

UFES 811 transmits the UAV operation request (block 852). The UAV operation request may be transmitted to USS/UTM 813, and may include aviation connectivity payload, UAV location, GPSI, USS information, etc. USS/UTM 813 being the USS/UTM selected by UFES 811 block 850. USS/UTM 813 transmits a UAV operation accept (event 856). The UAV operation accept may be transmitted to UFES 811, and may include authorization data and RITI. UFES 811 transmits the UAV operation accept (event 858). The UAV operation accept may be transmitted to SMF 809, and may include authorization data and RITI.

SMF 809 stores the authorization data (block 860). The authorization data being received in the UAV operation accept.

Secondary authorization and authentication is performed (block 862). The secondary authorization and authentication occurs during PDU session establishment, for example, and provides GPSI to USS/UTM 813. Optionally, for authorization of UAV 805 and UAV-C 815 pairing and for flight path authorization and registration for flight operation. USS/UTM 813 may also assign the RITI. SMF 809 configures user plane connectivity (block 864). The user plane connectivity is configured for UAV to UAV-C communications, for example. SMF 809 transmits a PDU session establishment accept (event 866). The PDU session establishment accept is transmitted to UAV 805, and may include the RITI.

UAV 805 broadcasts its UAV ID (block 868). The UAV ID is broadcast over-the-air for remote ID, and is based on the RITI. UAV 805 reports data using the UAV ID (block 870). UAV 805 reports data to USS/UTM 813, where the reporting is based on the RITI, for example. UAV 805 and UAV-C 815 communicate (event 872).

Figure 9:
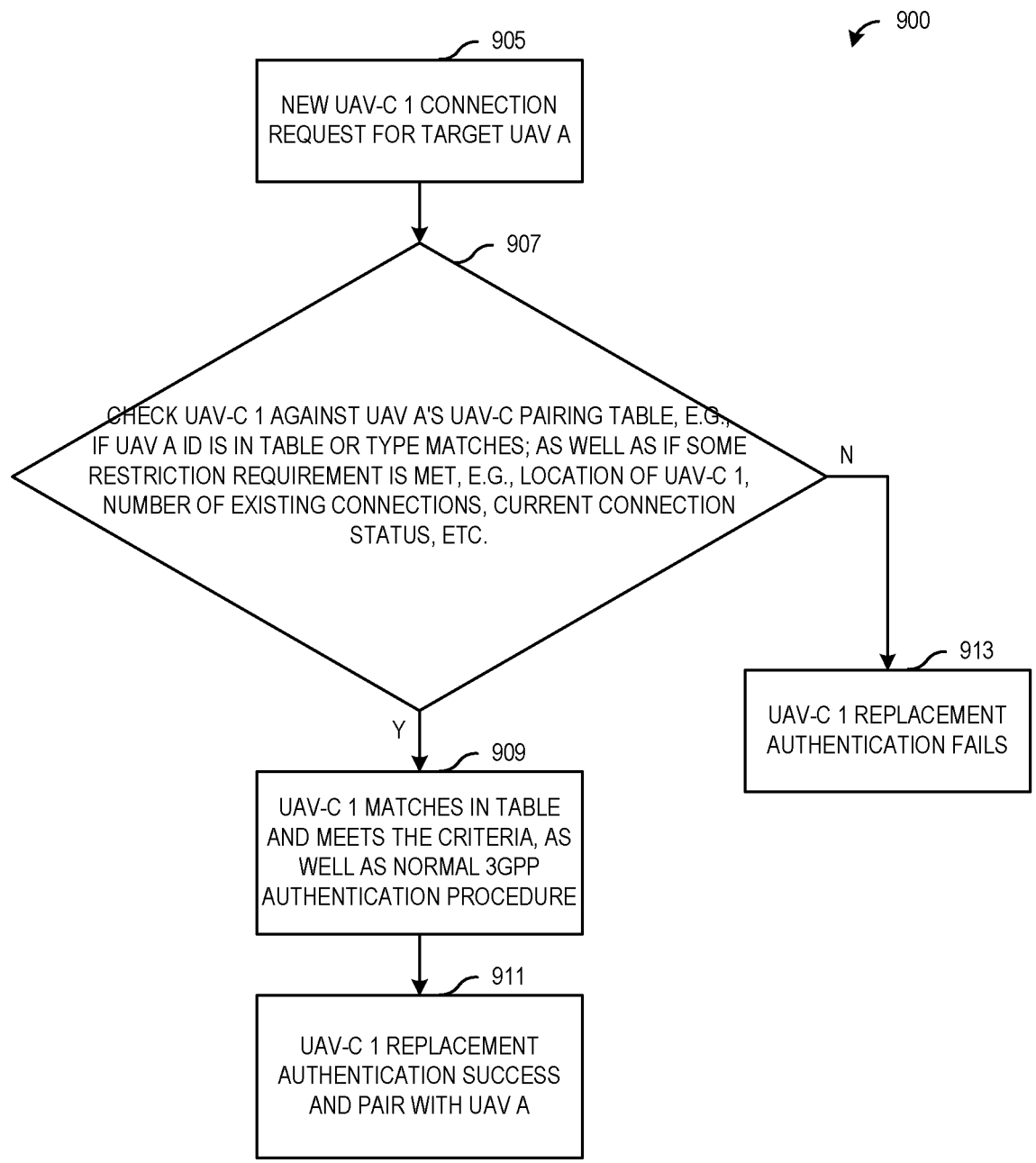
FIG. 9 illustrates a flow diagram of example operations in a 3GPP UAV controller authentication and authorization process according to example embodiments presented herein.

FIG. 9 illustrates a flow diagram of example operations 900 in a 3GPP UAV-C authentication and authorization process.

Operations 900 begin with a new UAV-C connection request for a target UAV being received (block 905). The new UAV-C connection request may be received by a 3GPP network entity. The 3GPP network entity to determine if the UAV-C is in the target UAV's UAV-C pairing table or if some other restriction criterion is met (block 907). If the check is true, then UAV-C is in the UAV-C pairing table and the restriction criterion is met (block 909) and the authentication process for UAV-C is successful and UAV-C pairs with the target UAV (block 911). If the check is false, the authentication process for UAV-C fails (block 913).

The management of UAVs has become an important security and safety issue to governments around the world. Identifying the UAV and its controller (i.e., the UAV-C) is a key and fundamental component in UAV management. As an example, the aviation authority (the Federal Aviation Administration (FAA)) has defined requirements and recommendations on UAV ID and tracking with two options:

Direct broadcast (local): In direct broadcasting, a UAV transmits data in one direction only with no specific destination or recipient.

Network publishing (to an FAA-approved Internet-based database, for example): In network publishing, the network transmits UAV data to an Internet service or a federation of services.

Figure 10:
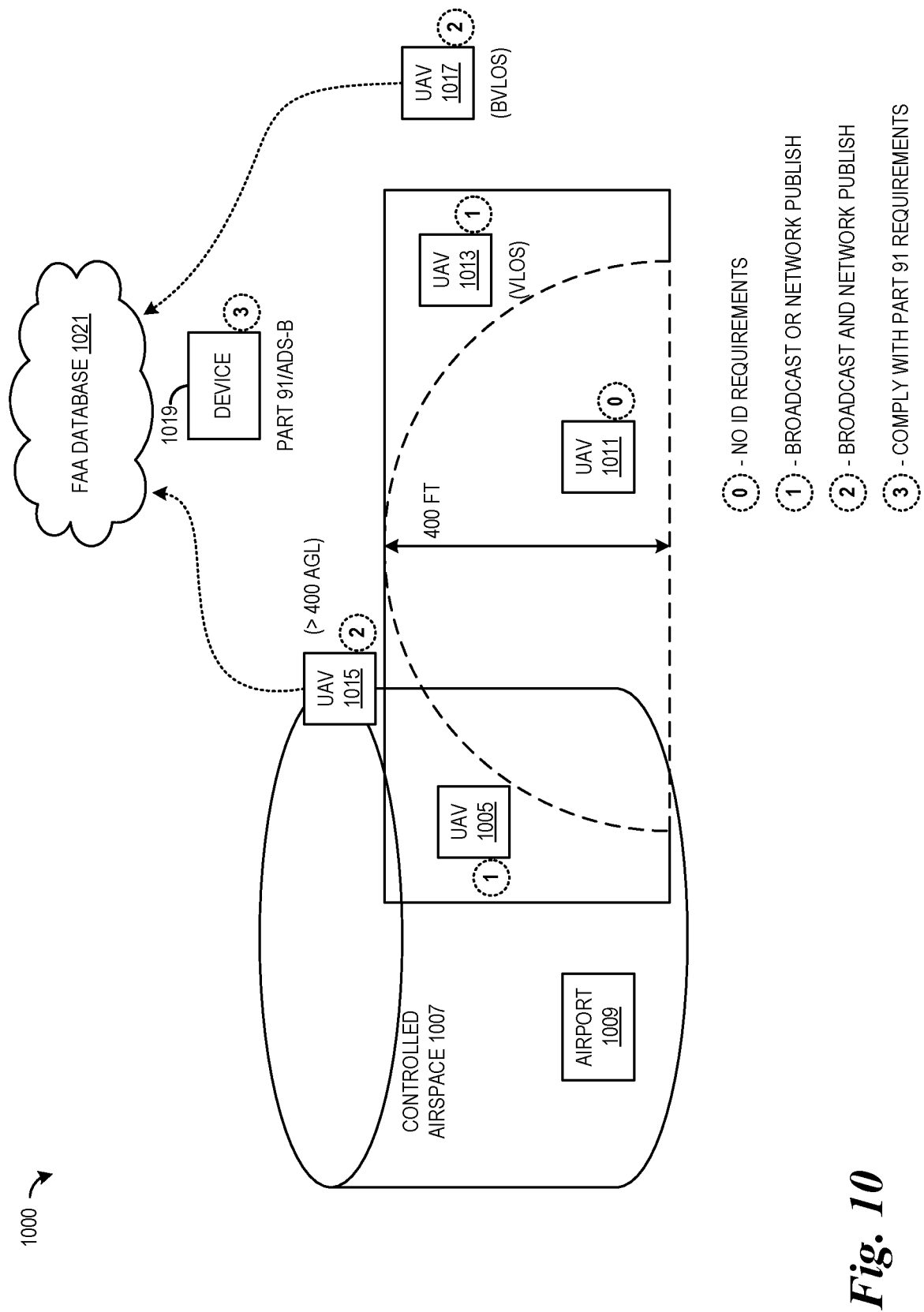
FIG. 10 illustrates a communication system highlighting the broadcast and network publishing of UAV data.

According to the FAA requirements, both broadcast and network publishing are required. FIG. 10 illustrates a communication system 1000 highlighting the broadcast and network publishing of UAV data. Communication system 1000 includes a first UAV 1005 that is operating in controlled airspace 1007 (which may be near an airport 1009, for example). First UAV 1005, due to its proximity to controlled airspace 1007, must notify an authority body pre-flight. First UAV 1005 can either broadcast or network publish its UAV data. A second UAV 1011, operating more than a specified distance from other UAVs or a controlled airspace (such as controlled airspace 1007) has no UAV ID requirements.

A third UAV 1013 is operating with visual line of sight (VLOS) of other UAVs and can either broadcast or network publish its UAV data. A fourth UAV 1015 is operating above a specified distance above ground level (AGL), for example, 400 feet AGL and must broadcast and network publish its UAV data. As an example, fourth UAV 1015 may publish its UAV data to a FAA database 1021. A fifth UAV 1017 is operating beyond VLOS (BVLOS) and must broadcast and network publish its UAV data. As an example, fifth UAV 1017 may publish its UAV data to a FAA database 1021. A device 1019 features automatic dependent surveillance-broadcast (ADS-B) functionality and uses satellite and radio signals to identify location and share the location in real-time. Device 1019 complies with FAA Part 91 requirements.

Figure 11:
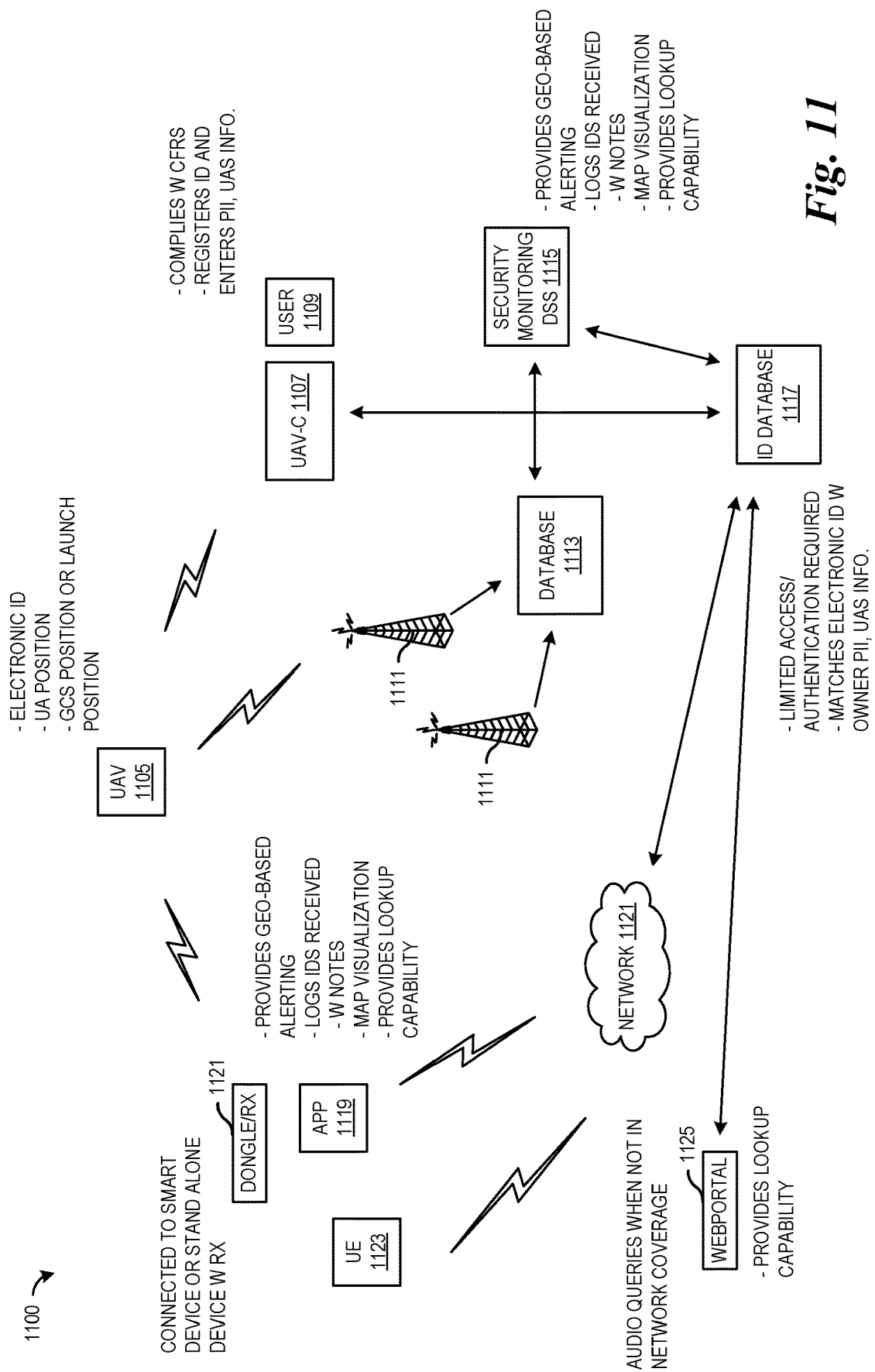
FIG. 11 illustrates a system highlighting UAV control and UAV data publishing.

FIG. 11 illustrates a system 1100 highlighting UAV control and UAV data publishing. System 1100 includes a UAV 1105 which is an unmanned aerial (UA) drone with electronic ID and ground control station (GCS) position or launch location information. UAV 1105 is controlled by a UAV-C 1107 (which may be operated by a user 1109). UAV-C 1107 complies with regulations and provides the UAV ID, personal identifying information (PII), UAS information, and so on.

System 1100 also includes fixed monitoring sites 1111 to monitor the UAVs, including UAV 1105. Information gathered by fixed monitoring sites 1111 are provided to a database 1113. A security monitoring drone surveillance system (DSS) 1115 accesses the information in database 1113. Security monitoring DSS 1115 provides a wide range of functionality, including, geo-based alerting, logs IDs with notation, map visualization, capability for lookup, and so on. An ID database 1117 stores information from security monitoring DSS, UAV-C 1107, etc.

An application 1119 monitors UAVs, including UAV 1105, using a dongle or receiver 1121, for example. Dongle or receiver 1121 may be connected to a smart device or a stand-alone device, such as a UE 1123. Application 1119 also provides a wide range of functionality, including, geo-based alerting, logs IDs with notation, map visualization, capability for lookup, and so on. A network 1121 provides connectivity for application 1119 and UE 1123 to ID database 1117. A webportal 1125 enables access to ID database 1117. Webportal 1125 provides lookup capability to a user, for example.

Information for UAS identification and tracking include:
Unique UAV identifier, this can be global define unique UAV ID which can be provided to 3GPP operator, or the international mobile equipment identity (IMEI).
The UAV pilot/operator identification information.
UAV controller identifier. This can be IMEI if this is networked UAV controller.
UAV pre-configured or historic flight path.
UAV and UAV controller location and operation time information. This can be historic information or real time information.
UAV operation status. Status of UAV operations, such as battery level, if in auto-pilot mode.

FAA requirements and recommendations on network publishing allow the 3GPP network to act as USS to provide the UAV identification and tracking information to an Internet based database (e.g., a UDM or ID database 1117 of FIG. 11). Authorities can access the Internet based database for ID and tracking information, or obtain UAV ID and tracking information based on queries from TPAEs or UTMs.

A new work item in 3GPP SA2 is tasked to develop a 3GPP based solution to support UAV identification and tracking. Multiple issues are presented, including:
UAV identification,
UAV identification excludes UAV detection, e.g., by the radio access network (RAN), and focusses on the assignment and usage of UAV IDs in the 3GPP system.
How does the 3GPP system interact with the UTM to enable UAV identification?
UAV and UAV-C tracking,
What information is required for the 3GPP system to track the UAV and the UAV-C?

There is no currently available solution that meets the regulatory requirement regarding network publishing based UAV ID and tracking. A combined 3GPP and UMT inter-working architecture (as shown in FIG. 4) is provided. Interface UAV1: interfaces the UAV with the 3GPP system to support UAV authorization, authentication, identification, and tracking. The example embodiments use and enhance this interface for 3GPP to obtain UAV and UAV controller's id and operation information. Interface UAV2: interfaces a TPAE with the 3GPP system for remote identification and tracking. The example embodiments use and enhance this interface to interact with TPAE for id and tracking. Interface UAV3: 3GPP user plane connectivity for transporting C2. Interface UAV4: interfaces a TPAE with a UAV over 3GPP network for: command and control (C2), and remote identification (RID) and tracking of the UAV. The example embodiments use and enhance this interface to interact with TPAE for id and tracking.

Interface UAV5: like UAV3 but on a transport side, outside the scope of 3GPP. Interface UAV6: interfaces the 3GPP system with external USS/UTM for functionality exposure, supports identification and tracking, and UAV authorization. The example embodiments use and enhance this interface to interact with TPAE for id and tracking. Interface UAV7: for RID information sent in broadcast, on a transport side, outside the scope of 3GPP. Interface UAV8: UAV8 is used for C2 over a transport side, outside the scope of 3GPP. Interface UAVg: UAVg supports connectivity between the UAV or a networked UAV Controller and the USS/UTM. Interface U2U: supports UAV to UAV communications for broadcast RID.

Figure 12:
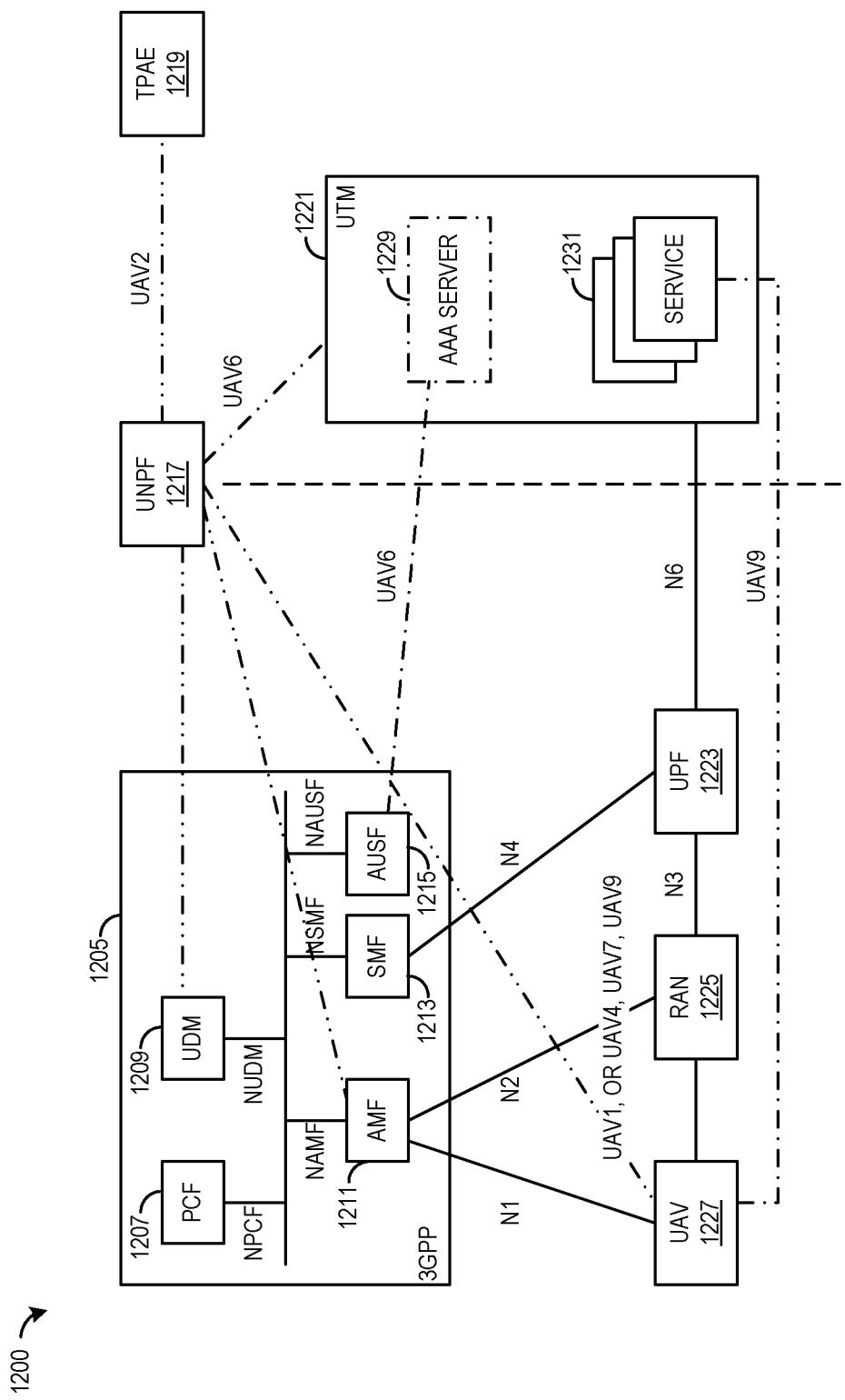
FIG. 12 illustrates a system with a 5G core (5GC) and enhanced functions for UAV management according to example embodiments presented herein.

FIG. 12 illustrates a system 1200 with a 5G core (5GC) and enhanced functions for UAV management. System 1200 includes a 5GC 1205 comprising a policy control function (PCF) 1207, a UDM 1209, an AMF 1211, a SMF 1213, and an authentication function (AUSF) 1215. PCF 1207 communicates with other nodes or functions in system 1200 using a variety of interfaces. UDM 1209 manages network user data in a centralized element. AMF 1211 performs mobility management. SMF 1213 interacts with a decoupled data plane to establish PDU sessions and manage sessions. AUSF 1215 derives and maintains security keys.

System 1200 also includes a UAS network publishing function (UNPF) 1217, a TPAE 1219, a UTM 1221, a user plane function (UPF) 1223, a RAN 1225, and one or more UAVs 1227. UNPF 1217 coordinates data collection, correlates the data with UAV ID, and publishes the information. UTM 1221 comprises a AAA server 1229 providing authentication, authorization, and accounting services, and services 1231.

According to an example embodiment, 3GPP based UAV ID and tracking methods and apparatus are provided. A novel network function coordinates with different 3GPP system components to collect and correlate different information with one or more IDs. Procedures are provided to collect UAV information and provide the information to third parties.

In an embodiment, the 3GPP system is assumed to have knowledge of the UE being a UAV. The 3GPP system has obtained and recorded the UAV's identifier information after the UAV successfully joined (registered and authorized) into the 3GPP system.

In an embodiment, the UNPF interacts with the mobile network system components of the 3GPP system to collect and correlate different information using UAV identifiers. The UNPF provides the 3GPP system with tracking and identifier information of UAVs. The UNPF may be located in 5G core network architecture as part of the 3GPP functions, with the functionality of the UNPF being distributed into different existing 5GC functions. Alternatively, the UNPF is implemented as an application level function outside of 3GPP core network architecture. Dependent on UNPF location, different interfaces with UAV may be used.

In an embodiment, the UNPF is used to coordinate the data collection, correlate the data with the correct UAV ID, and publish the information (data) to the TPAE or the UTM (using the UAV2 and UAV6 interfaces, for example). The UNPF uses the ID pairs (unique UAV IDs and 3GPP UE IDs) to correlate all the tracking information of the UAV and communicate with the TPAE and the UTM. This UNPF may be a standalone function in the 5GC, or the functionality of UNPF may be distributed into different existing 5GC functions, acting as AF interacting with different 5GC functions, for example.

Unique UAV physical identifier(s) are used. The UAV physical identifier(s) can be a globally defined unique UAV ID (which can be provided to 3GPP operator), or the 15 numbers of the IMEI as defined in 3GPP. Other physical IDs defined by other aviation organizations may also be used.

The 3GPP UE ID is an identifier used to identify UAV as UE in the 3GPP system. The 3GPP UE ID may be a subscriber permanent user ID (SPUI), a permanent equipment ID (PEI), and so on.

In an embodiment, there are several ways for 3GPP system to collect UAV identifier and tracking information to satisfy the requirement for the regulations:

Using two-way query/response communication between UNPF with UAV and networked UAV controller.

UAV and network UAV-C periodically send their identifier information to the UNPF.

3GPP system uses location services (LCS) mechanism (3GPP or other LCS solution) to tracking the UAV and provide the information to TPAE or UTM per request.

Potential options for supporting the above include:

Control plane solution: UAV and UAV controller can communicate with the 3GPP system with the tracking information via NAS to the AMF. The AMF forwards the information to the UNPF. There will be new UTM container defined in a NAS message to contain the UAV tracking information. Because many of the information are aviation level information, 3GPP doesn't need to have visibility of the information. Hence the mechanism can use the UAV1 interface.

User plane solution: UAV/network UAV controller communicates with the UNPF using application level protocol. The mechanism can enhance UAV1, UAV4, UAV7, or UAV9 interfaces. The 3GPP system can provide the UAV with the UNPF address for interaction using a control plane mechanism, e.g., using NAS between the UE and the 3GPP system, during UAV 3GPP network registration and access, for example. Alternatively, a UAV DNS query with the 3GPP system or other network system. Alternatively, an enhanced network exposure function (NEF) allows the UTM or the UNPF (if it's outside of the 3GPP system) to provide the UNPF with the access information, the NEF provides the information to UE via the AMF or other 3GPP functions.

Several scenarios are considered in the example embodiments for supporting the TPAE or the UTM querying UAV information for UAV identification and tracking (with impact on UAV2, UAV6):

The TPAE or UTM has no identifier information of the UAV: In such a situation, the TPAE and UTM will provide location information related to the queried UAV to the UNPF, the UNPF will interact with the 3GPP LCS functions using an existing LCS procedure to identify the UE which matches the location information, for example. The 3GPP LCS function identifies the UE (e.g., based on UE profile) as is the UAV queried by the TPAE or UTM. The 3GPP LCS function sends the UAV identifier and tracking information to the UNPF not the TPAE or UTM.

TPAE or UTM has full or partial identifier information of the UAV (UAV ID): In such a situation, the TPAE or UTM will send a query with unique UAV ID, and the UNPF will interact with the UAV or UAV-C, or other 5GC functions (such as the 3GPP LCS or the UDM) if needed to provide the corresponding UAV identifier and tracking information.

A standardized API is assumed for the interface between UNPF and TPAE or UTM for the UAV ID and tracking.

As related to the regulation requirement and regulation as listed in the annex, the following information can be provided by 3GPP system for UAV identification and tracking:

A unique UAV identifier, this is the globally unique ID, for example. This ID can be the IMEI, the IMSI, or other non-3GPP IDs assigned by an organization outside 3GPP and provided to 3GPP operator.

The UAV pilot/operator identification information.

The UAV controller identifier. This can be UAV controller physical ID, or the communication module ID, such as the IMEI if this is networked UAV controller.

The UAV pre-configured or historic flight path.

The UAV and UAV controller location and operation time information. This can be historic information or real time information.

The UAV operation status. Status of UAV operations, such as battery level if in auto-pilot mode, for example.

In an embodiment, the embodiment methods and apparatus can be also applied to the case where WiFi, Bluetooth, or some other low power RF radio access technologies is used as part of operator network or to link UAV and network. The 3GPP system mentioned in the embodiments include NR, LTE, MB-IoT, LTE-MTC, UMTS, and other 3GPP defined access technologies.

The example embodiments presented herein are based on the existing defined UE authentication and authorization procedure, but provide additional consideration from the UAS during 3GPP authentication and authorization with the UAV ID Information, including interacting with UTM.

In an embodiment, during the UE authentication and authorization phase for 3GPP network access and registration, if the UE is UAV or UAV-C (e.g., based on the subscription information or the indication from the UE), the 3GPP AUSF may forward some UAV or UAV-C IDs (e.g., may also include operator ID) and credentials to the UTM AAA server. The AUSF only authenticates UAV or UAV-C after receiving authentication success from the UTM, otherwise the AUSF will return authentication failure with reason code.

When the UAS (either UAV or UAV-C, for example) requests to establish, modify, or delete a PDU session for the communication between the UAV and the UAV-C or the UTM, the UAS will send a session establish request with the indication of its UAS type (e.g., UAV or UAV-C) and its connectivity type (e.g., control connectivity with the UAV-C or UTM) to the network. With this indication, the SMF can retrieve the subscription or policy information of this UAS UE and use the information for the PDU session authorization. If the subscription and policy includes an indication for secondary authentication and authorization, as well as the flight restriction which can be assisted by the 3GPP system (e.g., geofencing, connectivity capability, controller restrictions (such as number of C2 connections), so on), the SMF can trigger secondary authentication and authorization with the UTM's AAA server via UAV6, along with providing the information which is related to the restrictions and can be provided by the 3GPP system (such as UAV location, connectivity capability, UAV-C connectivity info, existing C2 of the UAV-C, so on).

In an embodiment, if secondary authentication and authorization with the UTM is successful, the SMF will continue the PDU establishment procedure.

Figure 13:
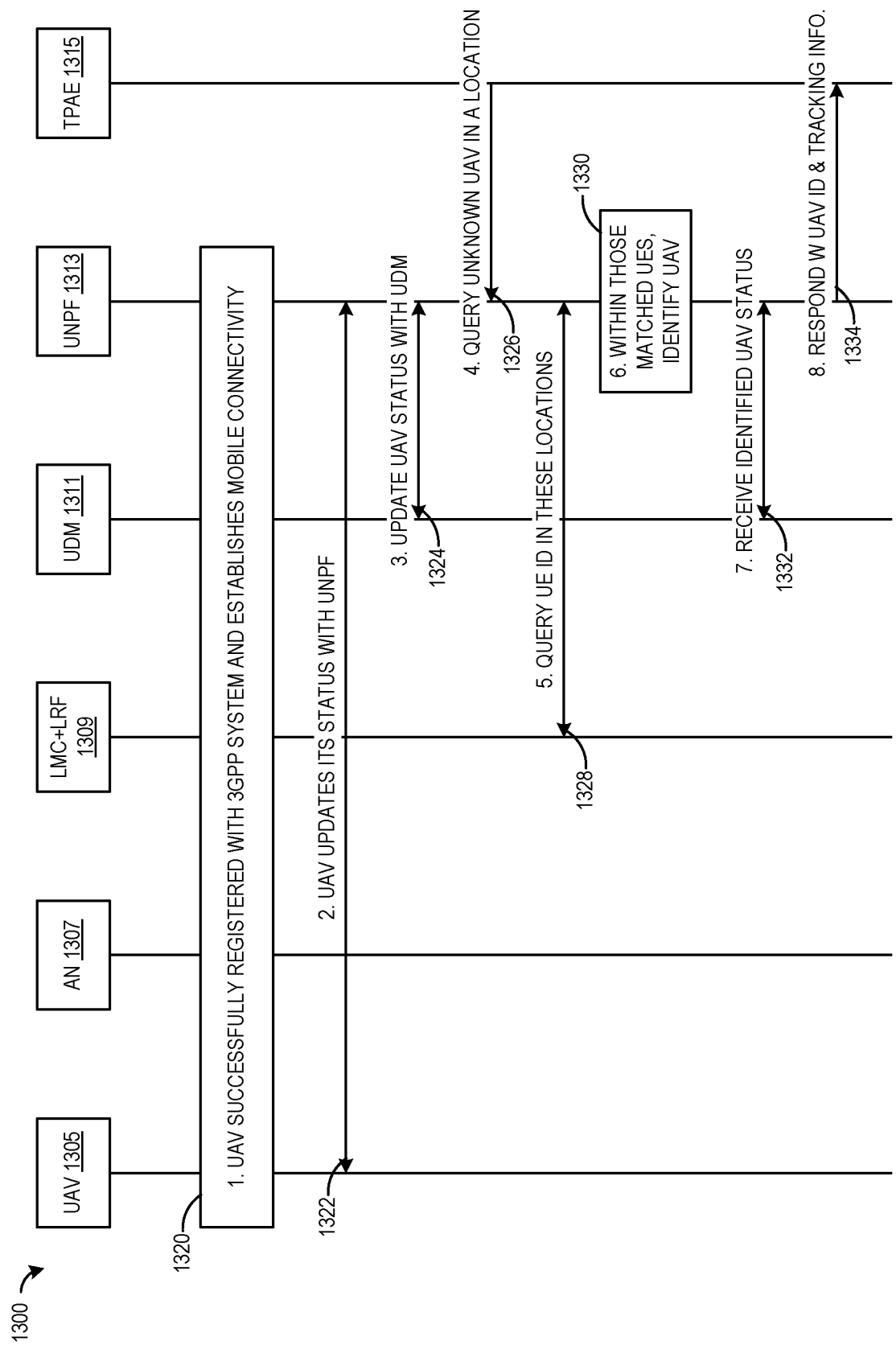
FIG. 13 illustrates a diagram highlighting messages exchanged and processing performed in identifying and tracking an unknown UAV, where the UAV is unknown to the third party authorized entity (TPAE) or UTM according to example embodiments presented herein.
Figure 14:
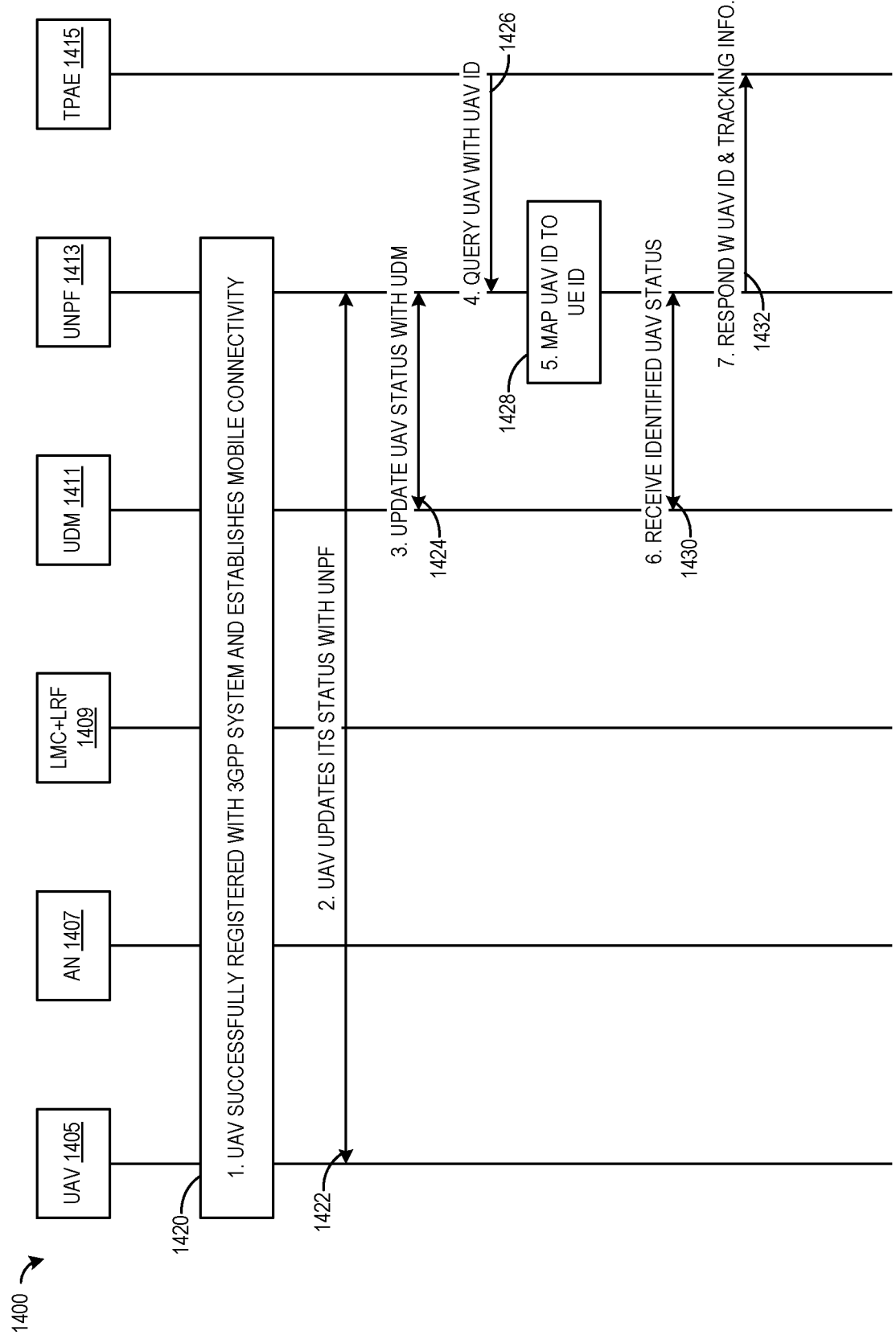
FIG. 14 illustrates a diagram highlighting messages exchanged and processing performed in identifying and tracking a known UAV, where the TPAE or UTM has some UAV identifier information according to example embodiments presented herein.

FIG. 13 illustrates a diagram 1300 highlighting messages exchanged and processing performed in identifying and tracking an unknown UAV, where the UAV is unknown to the TPAE or UTM. The messages exchanged and processing performed involve a UAV 1305, an access node (AN) 1307, a location management component (LMC) and location retrieval function (LRF) 1309, a UDM 1311, an UNPF 1313, and a TPAE 1315.

UAV 1305 conducts a registration and data connectivity procedure with the 3GPP network (block 1320). During this phase, the 3GPP network has knowledge of the identifier information of UAV 1305 and stores them in UDM 1311, and updates UNPF 1313 with this new UAV information (e.g., establish an entry with a mapping between UE IE and UAV ID). UAV 1305 update UNPF 1313 with its identifier information (the controller may be changed during the flight) and the operation status information (block 1322). UNPF 1313 updates the record of UE (i.e., UAV 1305) which is stored in UDM 1311 (event 1324).

TPAE 1315 queries UNPF 1313 regarding an un-identified UAV in a certain location (event 1326). UNPF 1313 interact with the 3GPP LCS functions (i.e., LMC and LRF 1309) to obtain ID information of UEs near the certain location (event 1328). UNPF 1313 identifies the UE which is UAV 1305, based on the 3GPP UE IE and UAV ID mapping, for example (block 1330). UNFP 1313 queries the latest UAV tracking information from UDM 1332 using the UE ID, for example (event 1332). UNPF 1313 responds to TPAE 1315 with the UAV identifier and tracking information (event 1334).

FIG. 4 illustrates a diagram 1400 highlighting messages exchanged and processing performed in identifying and tracking a known UAV, where the TPAE or UTM has some UAV identifier information. The messages exchanged and processing performed involve a UAV 1405, an AN 407, a LMC and LRF 409, a UDM 1411, an UNPF 1413, and a TPAE 415.

UAV 1405 conducts a registration and data connectivity procedure with the 3GPP network (block 1420). During this phase, the 3GPP network has knowledge of the identifier information of UAV 1405 and stores them in UDM 1411, and updates UNPF 1413 with this new UAV information (e.g., establish an entry with a mapping between UE IE and UAV ID). UAV 1405 update UNPF 1413 with its identifier information (the controller may be changed during the flight) and the operation status information (block 1422). UNPF 1413 updates the record of UE (i.e., UAV 1405) which is stored in UDM 1411 (event 1424).

TPAE 1415 sends a re-query to UNPF 1413 for tracking information of the UAV with UAV ID (event 1426). UNPF 1413 maps the UAV ID to the 3GPP UE ID (block 1428). UNPF 1413 obtains the UAV information from UDM 1411 with 3GPP UE ID (event 1430). UNPF 1413 responds to TPAE 1415 with the UAV identifier and tracking information (event 1432).

Figure 15:
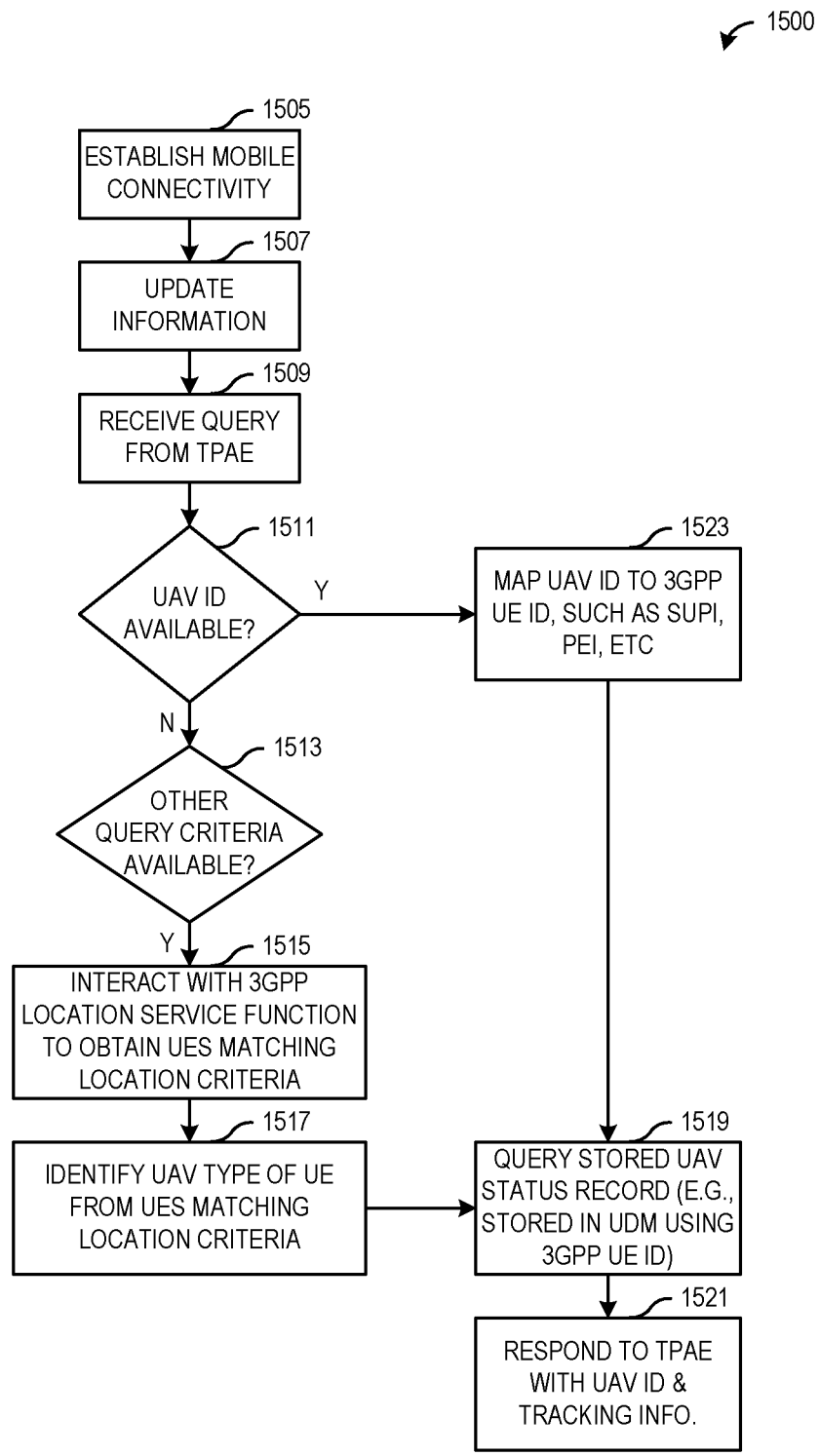
FIG. 15 illustrates a flow diagram of example operations occurring in a UAS network publishing function (UNPF) according to example embodiments presented herein.

FIG. 15 illustrates a flow diagram of example operations 1500 occurring in a UNPF. Operations 1500 may be indicative of operations occurring in a UNPF as the UNPF publishes UAV information.

Operations 1500 begin with a UAV establishing mobile connectivity with the 3GPP network (block 1505). Establishing mobile connectivity with the 3GPP network may involve the UAV connecting registration and data connectivity procedures with the 3GPP network. During this phase, the 3GPP network maintains the identifier information of the UAV. The UNPF is updated with the information of the UAV (block 1507). The information, which may include identifier information (e.g., UAV ID, mobile network ID, RITI, etc.) may be provided to the UNPF by the UAV, for example. It is possible that the UAV-C of the UAV may change during flight. The operation status information may also be changed. The operation status information may also be provided to the UNPF. The UNPF also updates the record of the UAV at the UDM.

The UNPF receives a query from the TPAE (block 1509). The query may be a query regarding an unidentified UAV in a certain location. The query from the TPAE may include a UAV ID, for example. The UNPF performs a check to determine if the query includes a UAV ID (block 1511). In other words, the UNPF is performing the check to determine if the UAV ID is included in the query.

If the UAV ID is not included in the query, the UNPF performs another check to determine if other query criteria are available (block 1513). Location information is an example of other query criteria. Other examples of other criteria may include UAV type, UAV subscription type, UAV priority, etc.

If the UAV ID is not included with the query but other query criteria are available, the UNPF interacts with the 3GPP LCS to determine UEs that match with the other query criteria (block 1515). As an example, the UNPF determines UEs that match with the location criteria. As another example, the UNPF determines UEs that match with the location criteria and UAV type criteria. The UNPF identifies the UAV type of the UE from the UEs that match the other query criteria (block 1517). The UNPF queries a stored UAV status record (block 1519). As an example, the UNPF queries UAV status records stored in the UDM. The query may make use of the 3GPP UE ID of the UAV, for example. The UNPF responds to the TPAE (block 1521). The response to the TPAE may include the UAV ID and tracking information of the UAV, for example.

If the UAV ID is included in the query (block 1511), the UNPF maps the UAV ID to a 3GPP ID (block 1523). The UAV ID may be mapped to 3GPP IDs such as SUPI, PEI, and so on. The UNPF queries a stored UAV status record (block 1519). As an example, the UNPF queries UAV status records stored in the UDM. The query may make use of the 3GPP UE ID of the UAV, for example. The UNPF responds to the TPAE (block 1521). The response to the TPAE may include the UAV ID and tracking information of the UAV, for example.

Figure 16:
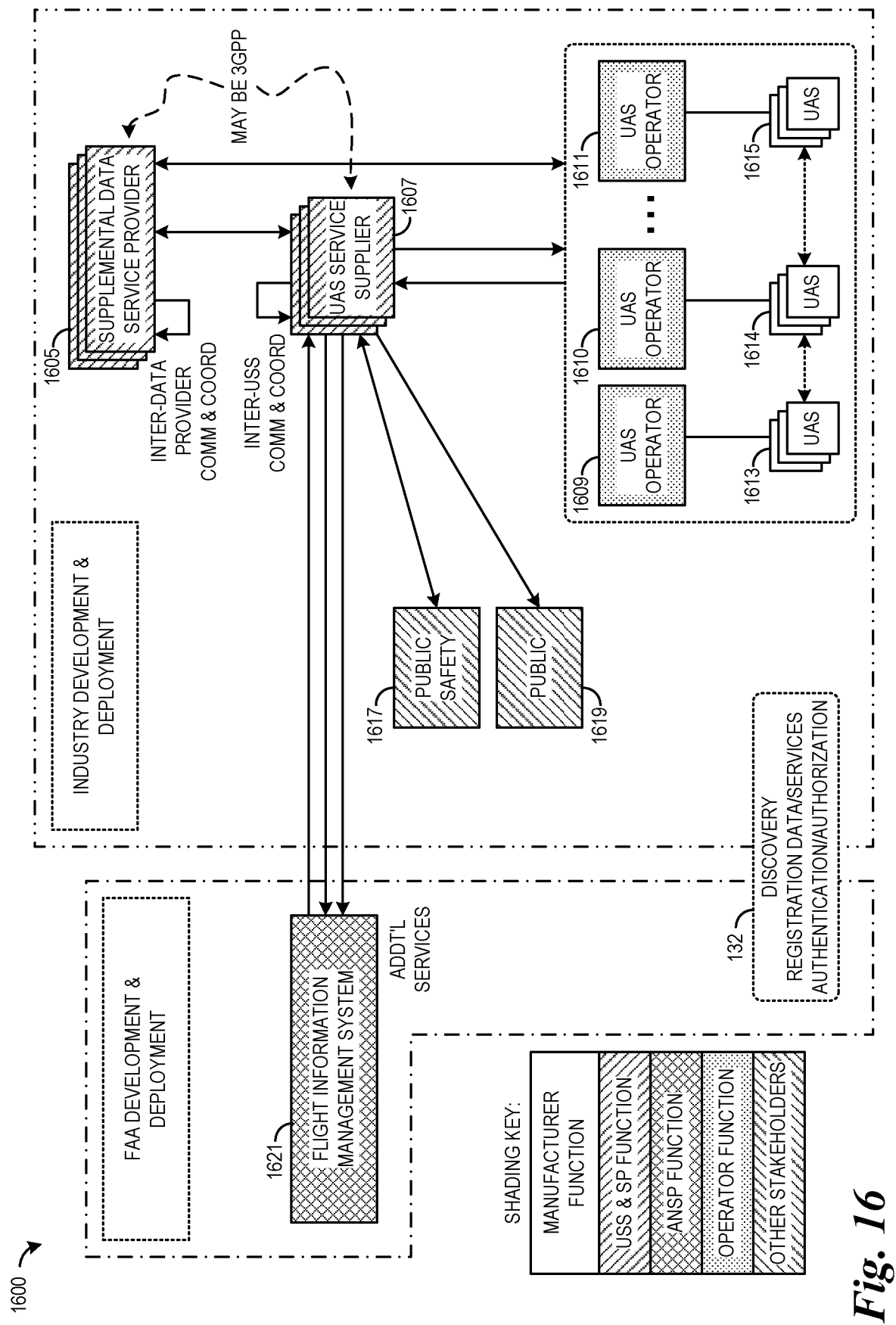
FIG. 16 illustrates an example UTM architecture where the UAS service supplier (USS) comprises 3GPP components according to example embodiments presented herein.

There may be multiple deployment scenarios regarding the relationship between 3GPP and UTM. A first scenario, 3GPP may be a USS within the UTM system. FIG. 16 illustrates an example UTM architecture 1600 where the USS comprises 3GPP components. An industrial development and deployment component of UTM architecture 1600 includes supplemental data service providers 1605 and UAS service providers 1607, which may be 3GPP. Supplemental data service providers 1605 may have inter-data provider communication and coordination, while UAS service providers 1607 may have inter-USS communication and coordination. Between supplemental service providers 1605 and UAS service providers 1607 may be communications exchanging information such as terrain, weather, surveillance, performance, and so on, information.

UTM architecture 1600 also includes UAS operators 1609-1611 coupled to UASs 1613-1615. Vehicle-to-vehicle (V2V) communications may take place between UASs 1613-1615. UAS operators 1609-1611 may share operation intent, real-time information, etc., with UAS service providers 1607. UAS service providers 1607 may share other operators operation intent, constraints, notifications, and so on, with UAS operators 1609-1611.

Public safety services 1617 and public services 1619 may also communicate with UAS service suppliers 1607, sharing operations, constraints, notifications, information, and so on.

A governmental regulatory (e.g., FAA) development and deployment component of UTM architecture 1600 includes a flight information management system 1621. Flight information management system 1621 may provide services and components that have shared responsibilities.

Interaction may exist between industrial and governmental components of UTM architecture 1600. As an example, flight information management system 1621 may provide constraints, requests for information, and so on, to UAS service providers 1607, while UAS service providers 1607 may provide responses, operations, notification, etc., to flight information management system 1621.

As shown in FIG. 16, the 3GPP system provides support for the UTM by way of the 3GPP network exposure functions.

Figure 17:
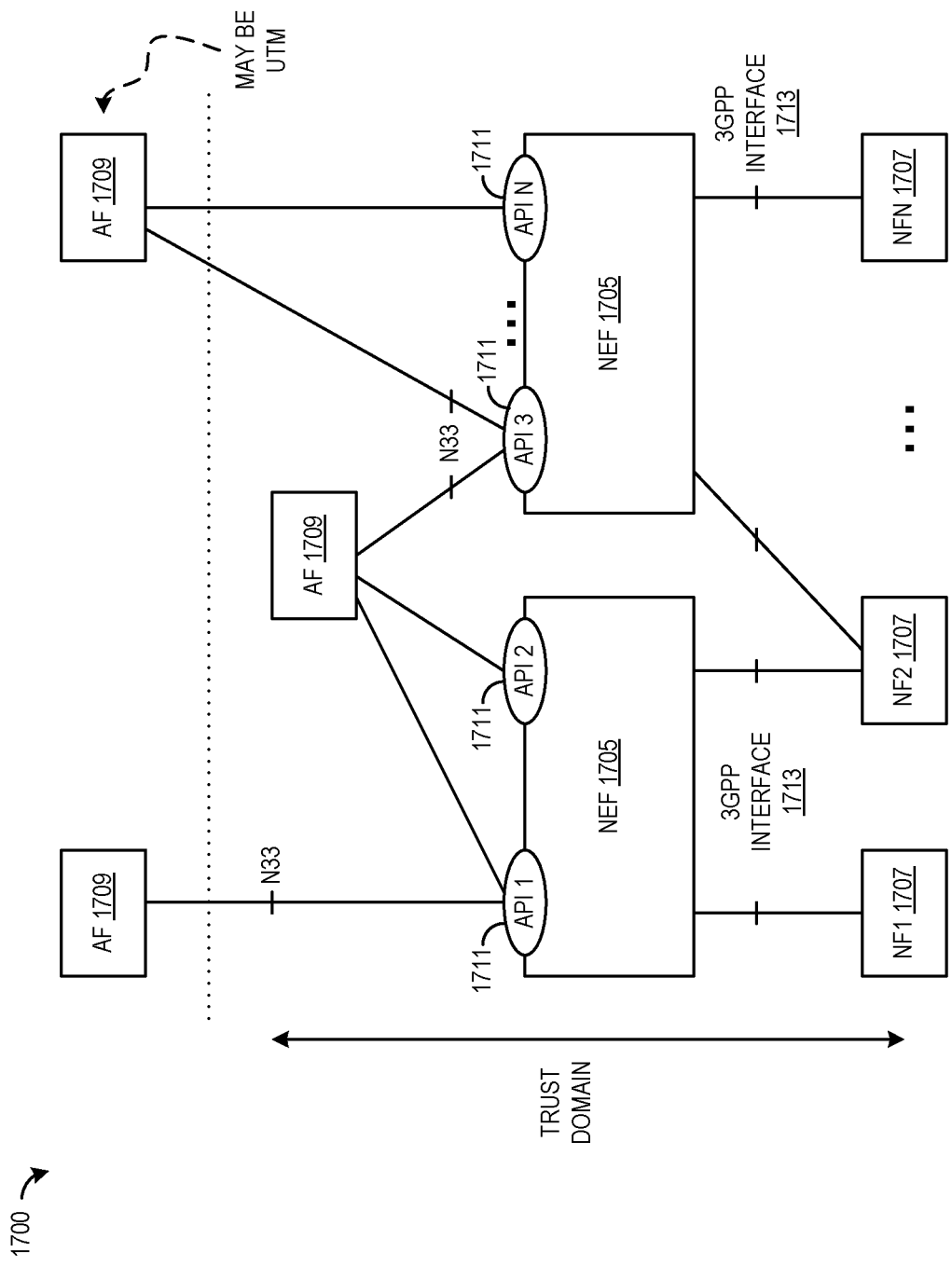
FIG. 17 illustrates an example UTM architecture where 3GPP components external to the UTM according to example embodiments presented herein.

FIG. 17 illustrates an example UTM architecture 1700 where 3GPP components external to the UTM. UTM architecture 1700 includes 3GPP network exposure functions (NEFs) 1705 that support external exposure of capabilities and services of 3GPP network functions 1707 to over-the-top applications (e.g., application functions (AFs) 1709). Some of the AFs 1709 may be or implement functions of the UTM. Application programming interfaces (APIs) 1711 define interactions between NEFs 1705 and AFs 1709.

NEFs 1705 may support external exposure of capabilities and services of the 3GPP network function for over-the-top applications.

There are existing network exposure capabilities which can be used for the UTM, such as the UTM querying a UE or UAS's location information for geofencing, UAV or UAS communication capability for UAV flight operations, or which UTM can query UAS ID and tracking information. However, those existing APIs focus on information being queried by the UTM. The 3GPP system can also perform some actions to assist the UTM with its network exposure capabilities. These actions include:

Tracking UAV movement and trigger geofencing alarm to UTM.

Provide assistance to prevent UAV and UAV controller to connecting to UTM while UTM is congested or conduct some pre-authentication/authorization for UTM based on the policy and instruction from UTM, such as location and communication capability.

According to an embodiment, network exposure capabilities API for the 3GPP system to the UTM are provided. The network exposure capabilities API includes new parameters and information that are exchanged between the 3GPP system and the UTM (operating as an AF, for example). The parameters and information enhance the UE monitoring report capability for the UTM, including monitoring critical UAS communication status and UAV location for UAV geofencing purposes. The parameters and information further enhance NEF provisioning capability to allow the UTM to provide network connectivity behavior policy and instructions to the 3GPP system.

As shown in FIG. 17, NEFs 1705 provide the mobile operator PLMN, while the 3GPP interfaces 1713 represent southbound interfaces between NEFs 1705 and NFs 1707 (which may be 5GC network functions). Examples of 3GPP interfaces 1713 include the N29 interface between NEFs 1705 and the SMF, the N30 interface between NEFs 1705 and the PCF, and so on. Not every southbound interface is shown in FIG. 17 for the sake of simplicity. NFs 1707 represent different network functions in the network in which NEFs 1705 can interact with to provide services to AFs 1709.

Figure 18:
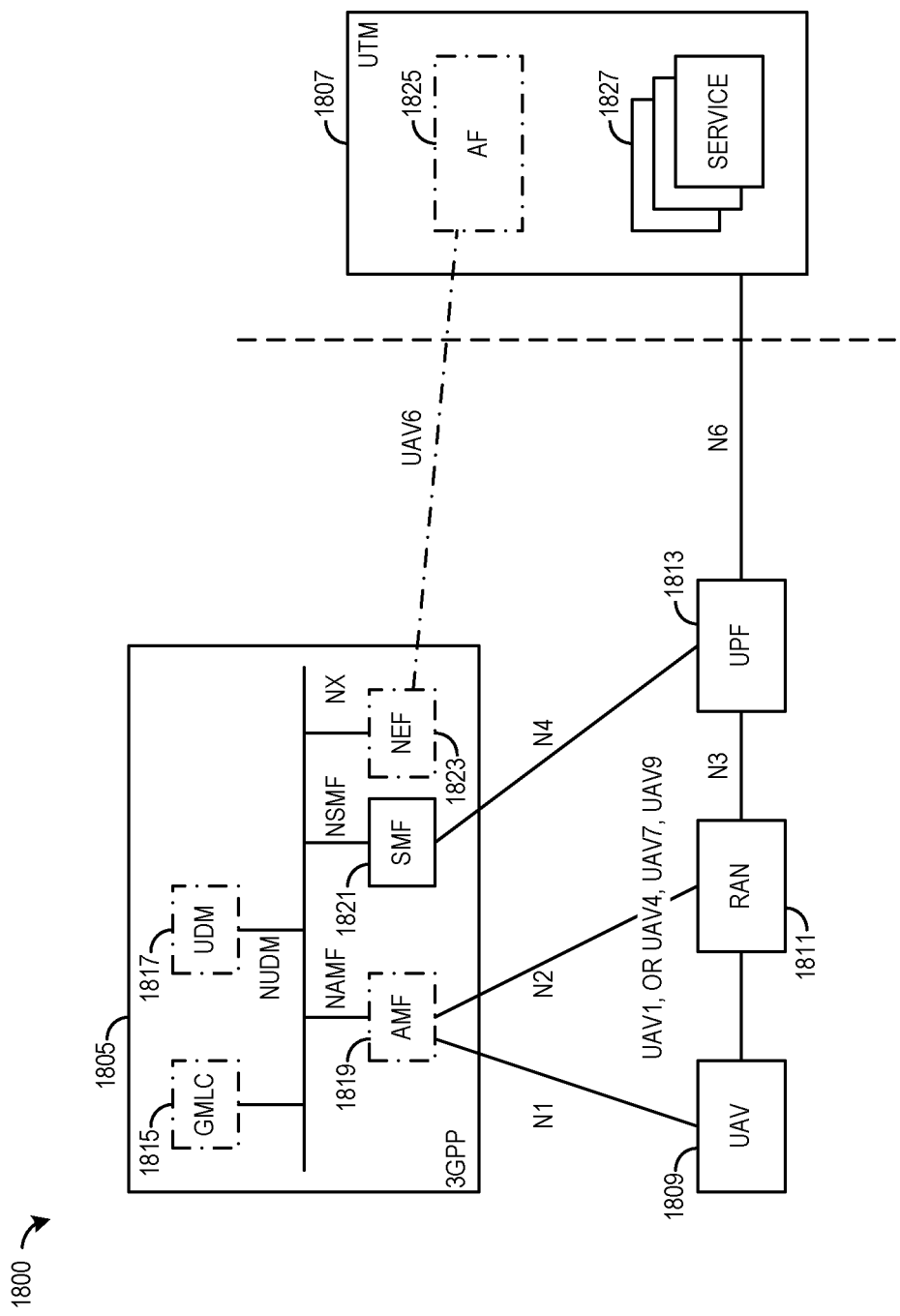
FIG. 18 illustrates an example UTM architecture with enhanced 5GC functions according to example embodiments presented herein.

FIG. 18 illustrates an example UTM architecture 1800 with enhanced 5GC functions. UTM architecture 1800 includes a 5GC 1805, and a UTM 1807. Also included in UTM architecture 1800 is one or more UAVs 1809, a RAN 1811, and a UPF 1813. 5GC 1805 and UTM 1807 provide connectivity and services for UAVs 18o9 that are connected to 5GC 1805 and UTM 1807 by RAN 1811 and UPF 1813.

5GC 1805 includes a gateway mobile location center (GMLC) 1815, a unified data management (UDM) 1817, an AMF 1819, a SMF 1821, and a NEF 1823. GMLC 1815 provides functionality supporting location based services, while UDM 1817 manages network user data in a centralized manner. AMF 1819, SMF 1821, and NEF 1823 are as described previously. UTM 1807 includes AF 1825 and services 1827.

In an embodiment, an enhanced NEF monitoring event report is provided. As an example, the enhanced NEF monitoring event report includes a deferred location report for UEs that are identified as UAVs entering or operating in a specified area. The report event is triggered when a UE that is identified as a UAV (per subscription, for example) enters, exists in, or is operating within a specified geofencing or geocaging area. The UTM subscribes to the monitoring event report with area information for tracking purposes. The enhanced NEF monitoring includes:

Deferred location report on a UE (or UEs) identified as a UAV enters or is located in a certain area. The report event may be triggered when the UE identified as a UAV per its subscription enters, is existing, or is located within a certain geofencing or geocaging area. The UTM (implemented as an AF, for example) can subscribe to the deferred location report with the information or area specified for tracking. The legacy deferred location report can only report locations based on a requested UE. An example description of the deferred location report is as follows:

Indicates either the Current Location or the Last Known Location of a UE; or the information for the UE(s) in a certain location.

When the AMF is the detecting NF,
One-time and Continuous Location Reporting are supported for the Current Location. For Continuous Location Reporting the serving node(s) sends a notification every time it becomes aware of a location change, with the granularity depending on the accepted accuracy of location.

For Last Known Location only One-time Reporting is supported or one-time UE (or group of UE) information when the UE is trying to establish connection in certain location or entering a requested area with an existing connection. The UE may belong or be identified to certain group or category, such as UAV. The connection can be specified in order to associate with the location report, such as PDU ID, or if the connection is for UAV control.

When the GMLC is the detecting NF,
Immediate and Deferred Location Reporting is supported. For Deferred Location Reporting the event types UE availability, Area, Periodic Location, and Periodic Motion are supported. The deferred location reporting can be triggered while one or a group of UE(s) which are identified by certain type (e.g., UAV) are entering or existing in a certain area.

The information of the UE can include, e.g., the indication of UAV, UAV ID, associated UAV controller ID, the connectivity information of the connection between UAV and its UAV-C (e.g., IP address, QoS). What information can be included will be determined by what information the UTM (e.g., the AF) likes to subscribe to or query.

The new reports may also be introduced as a new event or be added into an existing event. Alternatively, the information may be reported in another report message as defined by a technical standard.

In an embodiment, a novel report information on potential UEs that are detected by the network as flying drones (e.g., UAVs) through the use of cellular drone detecting capability. For example, the newly introduced reporting information as presented above may further include an indication if the UE is a potential drone or not a potential drone. Alternatively, a new event to report the information of UEs that are drones or suspected drones within a certain location is provided.

The example embodiments presented herein add new capability of the network reporting suspected drone UEs when the network may not have UAV subscriptions for those UEs or no knowledge if a network registered UE is attached to a flying drone.

The network may also report the UE as a drone that does not belong to or registered with the network, but the network has detected the UE as a suspected drone. For these kinds of UEs, the report information may only contain the location information, and suspected drone indication or potential UAV ID (in the case when the network can receive the UAV ID in the UAV's broadcast message, for example), but no UE ID.

In an embodiment, a drone detection event subscription or query message is provided between the AF and the NEF to enable the report on suspect drone UEs. Alternatively, the information can be used by other network functions within the 3GPP network using a control interface between the network functions. Typically, the determination of the UE being a drone or not may be performed in the RAN or a data analytic function with input from the RAN. The NEF (or another network function) will coordinate with the functions to generate the report to the AF.

An embodiment general UE detection event subscription and report can apply to other specific service UEs, such as vehicles or humans if those service UEs present certain radio characteristics and can be detected by the RAN using certain radio technologies.

In an embodiment, uplink data delivery status is added for certain connectivities or flows. Because the UAV control links (e.g., C2 or the connection with the UTM) are important, certain communication key performance indicators (KPI) are needed. As an example, uplink traffic status (which is a response from the controller) is important. The AF may, based on the C2 connection status, make a decision regarding if the UAV needs to be in good coverage. Currently, the NEF only tracks the downlink and not the uplink. As an example, the UTM subscribes to a periodic UAV flight report that includes UAV flight behavior information (such as UAV position, UAF flight status, flight trajectory, UAV speed, UAV power status, UAV radio resource control (RRC) status with its UAV-C, and so on).

Figure 19:
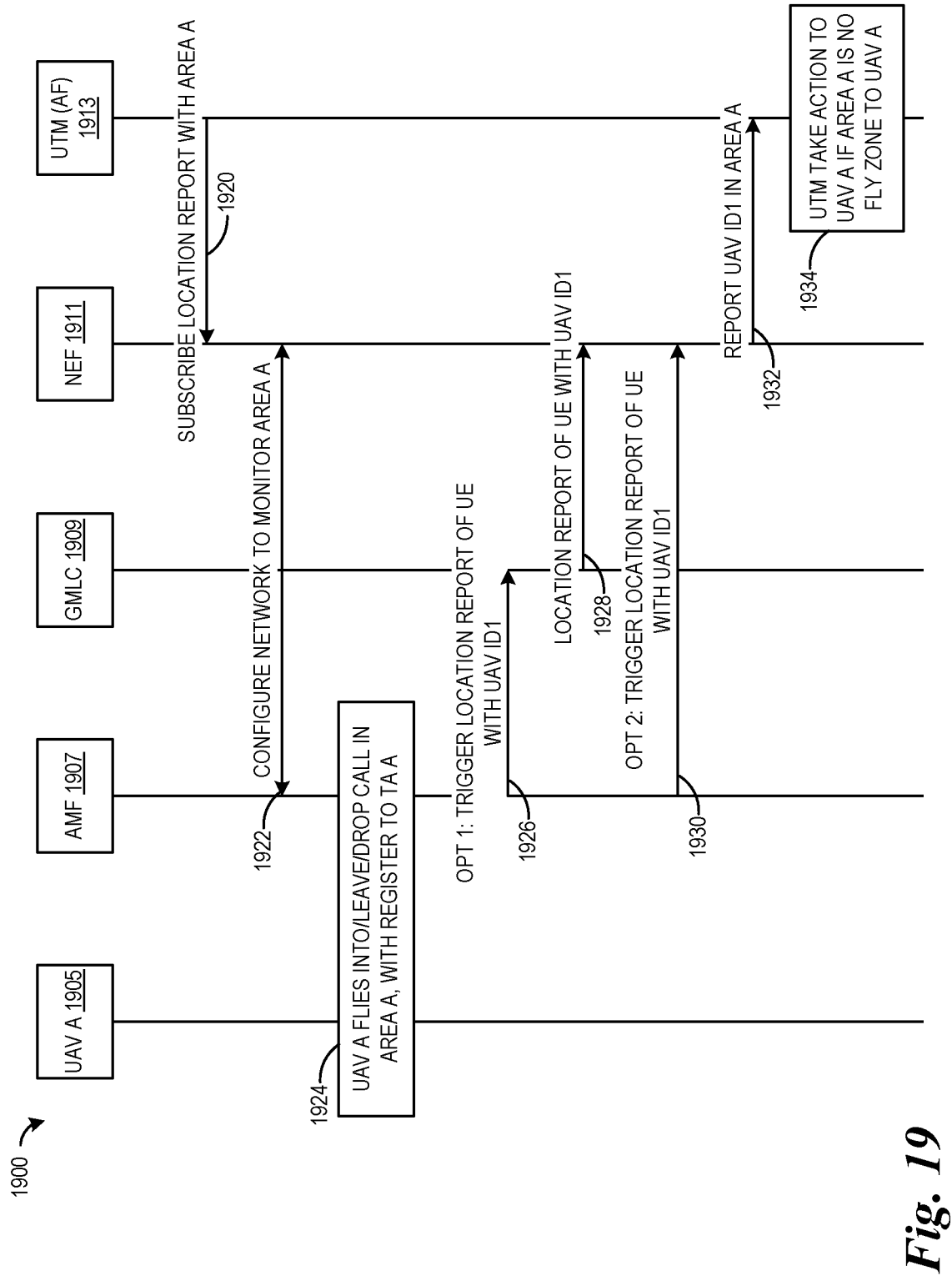
FIG. 19 illustrates a diagram highlighting messages exchanged and processing performed in 3GPP based monitoring according to example embodiments presented herein.

FIG. 19 illustrates a diagram 1400 highlighting messages exchanged and processing performed in 3GPP based monitoring. The messages exchanged and processing performed involve a UAV A 1905, an AMF 1907, a GMLC 1909, a NEF 1911, and a UTM 1913. UTM 1913 may be implemented as an AF, for example.

UTM 1913 subscribes to a location report (event 1920). UTM 1913 may subscribe to the location report by sending a request to NEF 1911, for example. The request specifies an area (e.g., area A) or a location. NEF 1911 and AMF 1907 configure the network to monitor the specified area (event 1922). UAV A 1905 flies into, leaves, or drops a call in the specified area, with UAV A 1905 being registered to tracking area (TA) A (block 1924). AMF 1907 detects the change associated with UAV A 1905.

In a first option, AMF 1907 triggers a location report for UE with UAV ID1, i.e., UAV A 1905, to GMLC 1909 (event 1926) and GMLC 19o9 sends a location report of UE with UAV ID1 to NEF 1911 (event 1928). In a second option, AMF 1907 triggers a location report for UE with UAV ID1 directly to NEF 1911 (event 1930). Regardless of option, NEF 1911 sends a location report of UAV ID1 in area A to UTM 1913 (event 1932). UTM 1913 takes action with respect to UAV A 1905 if area A is a no fly zone for UAV A 1905 (block 1934).

The mapping between the tracking area for a UAV and the 3GPP TA may be 1:1 or 1:N, where the mapping relationship is based on an agreement between the UTM and the 3GPP network.

The 3GPP provisioning capability allows an external party (e.g., a third party) to provision the information, such as an expected UE behavior and service specific parameters, or the 5G virtual network (VN) group information to 5G network functions. Embodiment applications include enhancing provisioning capabilities of the NEF to allow the UTM to provide instruction or policy to the 3GPP network to assist the UTM. A detailed discussion is provided below.

In an embodiment, new provisioning information on restrictions and instructions on establishing connectivity between a UAV (e.g., a UE in the 3GPP network) and the UTM or the UAV-C are provided. The restrictions may be used by the 3GPP network during the UAV or UAV-C authentication and authorization phase, or during the establishment process of a data session for the connection between the UAV and the UTM or the UAV-C. The restrictions may be provided by the UTM to the 3GPP network by way of the NEF, for example, which further distributes the restriction to other 3GPP functions, such as the UDM, the AMF, the SMF, or RAN functions. The restrictions may also be preconfigured as part of the UE's subscription, based on the agreement between the UTM and the 3GPP network. The network functions will use the information in the manner discussed previously.

Examples of the restrictions and indication information include:

A location restriction in which the UAV is not allowed to establish connectivity with the UAV-C or the UTM. As an example, if the UAV tries to establish a 3GPP connection in a restricted area, the 3GPP system should reject the request.

The UAV's communication capability and QoS requirement for some or all of the UAV's connections. The communication capability may be mapped to the 3GPP developed RAN features for supporting the UAV, for example.

Indication(s) indicating if the 3GPP system should be triggered to conduct further authentication and authorization for the data connections if the data connections are the connections with the UAV-C and the UTM. The action of the 3GPP system may include triggering a secondary authorization with the UTM, verifying if the UE has another existing C2 connectivity and its association information that can be reported to the UTM.

An indication indicating if the UE is allowed to be used for certain drones (e.g., if the smartphone UE is not allowed to be used for a certain drone, or certain UE ID only allowed to bind with a certain UAV ID).

Policy regarding other connectivity handling when a certain emergency or failure event, such as sending an alarm to the UTM when certain connectivity is lost or deteriorating, or disconnect all UAVs' connections if the authorization for the connection with the UTM or the UAV-C has failed, so on, occurs.

Other UAV or UAV-C connectivity behaviors which can be used by the 3GPP systems to assist the UTM in UAV management.

The information may also be distributed to the 3GPP NFs by other means. As an example, the information may be provisioned to the UDM, which then distributes the information to other 3GPP functions, such as the RAN, the AMF, the SMF, and so on. The information, as described herein, may also be applied to other UEs and applications that require similar services.

Figure 20:
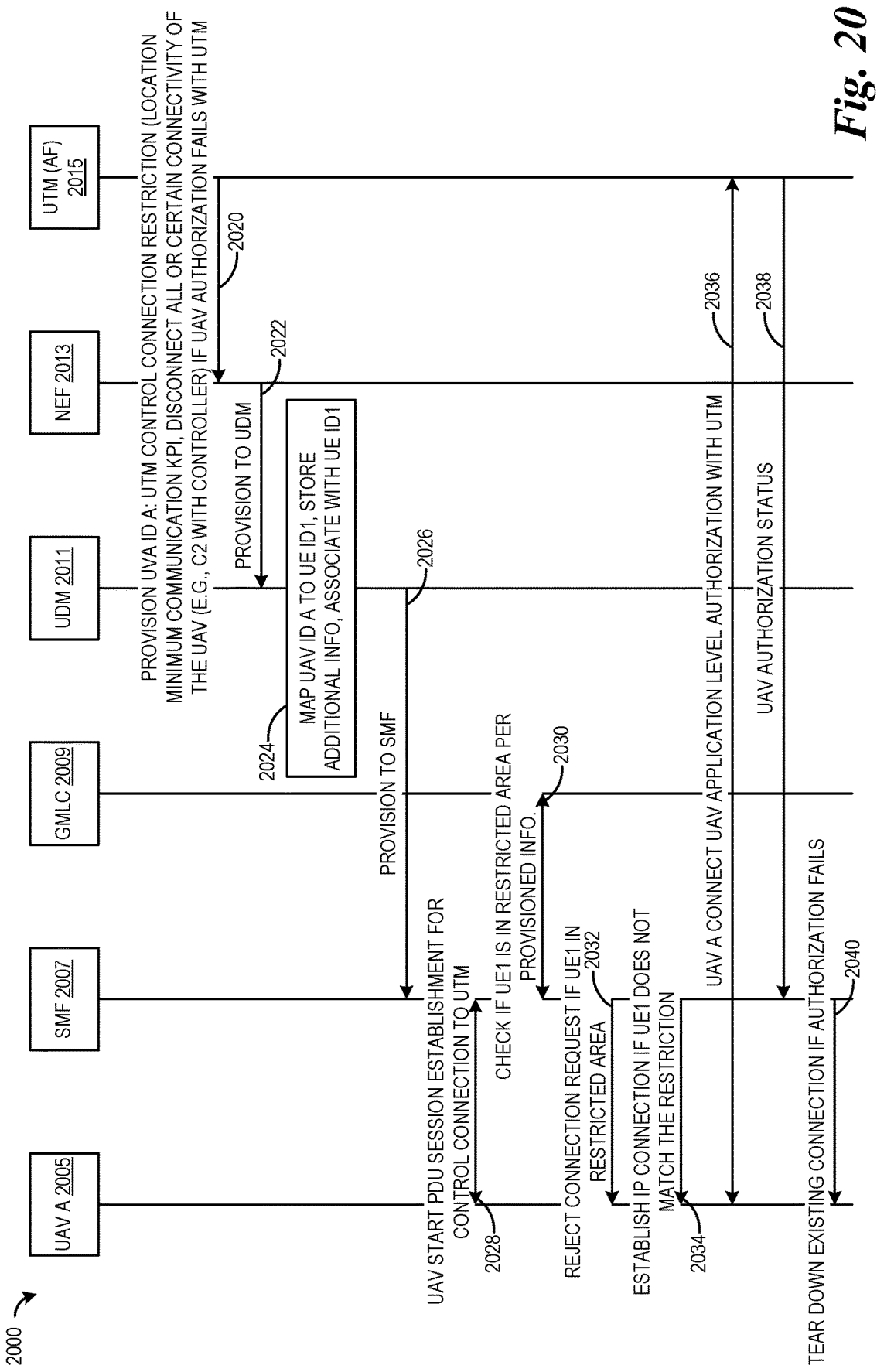
FIG. 20 illustrates a diagram highlighting messages exchanged and processing performed in the 3GPP system providing support to the UTM for UAV authorization according to example embodiments presented herein.

FIG. 20 illustrates a diagram 2000 highlighting messages exchanged and processing performed in the 3GPP system providing support to the UTM for UAV authorization. The messages exchanged and processing performed involve a UAV A 2005, a SMF 2007, a GMLC 2009, a UDM 2011, a NEF 2013, and a UTM 2015. UTM 2015 may be implemented as an AF, for example.

UTM 2015 provisions a UAV ID A (event 2020). In addition to the UAV ID A, UTM 2015 controls connection restrictions (e.g., location, minimum communication KPI, disconnect all or some connectivity of the UAV (such as a C2 connection with the UAV-C)) in the event of UAV authorization failure with UTM 2015. The provisioned UAV ID A is provided to NEF 2013, for example. NEF 2013 provisions the UAV ID A to UDM 2011 (event 2022).

UDM 2011 maps the provisioned UAV ID A to a UE ID1 (block 2024). In addition to mapping the provisioned UAV ID A to the UE ID1, UDM 2011 stores additional information (as provided by UTM 2015, for example) and associates the additional information with UE ID1. UDM 2011 establishes a UAV ID A and UE ID1 binding during a UAV network registration phase prior to a PDU establishment phase. In the UAV network registration phase, the binding may be part of the UE subscription or the UAV ID A may be dynamically assigned by the 3GPP system that associates the UAV ID A with the UE ID1. Alternatively, U T M 2015 assigns the UAV ID A associated with the UE ID1 and provides it to the 3GPP system for the binding. ID binding is also presented earlier in the present discussion.

UDM 2011 provisions UAV ID A to SMF 2007 (event 2026). UDM 2011 also provides the mapping to UE ID1 and the additional information along with the UAV ID A.

UAV 2005 starts a PDU session establishment procedure for a control connection to UTM 2015 (event 2028). UAV 2005 starts the PDU session establishment procedure by communicating with SMF 2007, for example. SMF 2007 checks with GMLC 2009 to determine if UE1 (UAV 2005) is in a restricted area (event 2030). UE1 may be the communication module (with SIM card, for example) embedded in UAV A 2005. A single UAV may have one or more UEs. In this particular discussion, a 1:1 relationship is shown.

SMF 2007 may check to determine if UE1 is in the restricted area in accordance with the provisioned additional information, for example. SMF 2007 rejects the PDU session establishment procedure if UE1 is in the restricted area (event 2032). If UE1 is not in the restricted area, SMF 2007 establishes the IP connection by participating in the PDU session establishment procedure (event 2034).

If the PDU session establishment procedure completes successfully (i.e., UE1 is not in the restricted area and does not match any other restrictions), UAV A 2005 performs a UAV application level authorization with UTM 2015 (event 2036). UTM 2015 reports the UAV authorization to SMF 2007 (event 2038). If the UAV authorization failed, existing connections are torn down (event 2040). As an example, existing connections of UAV 205 are torn down.

Figure 21A:
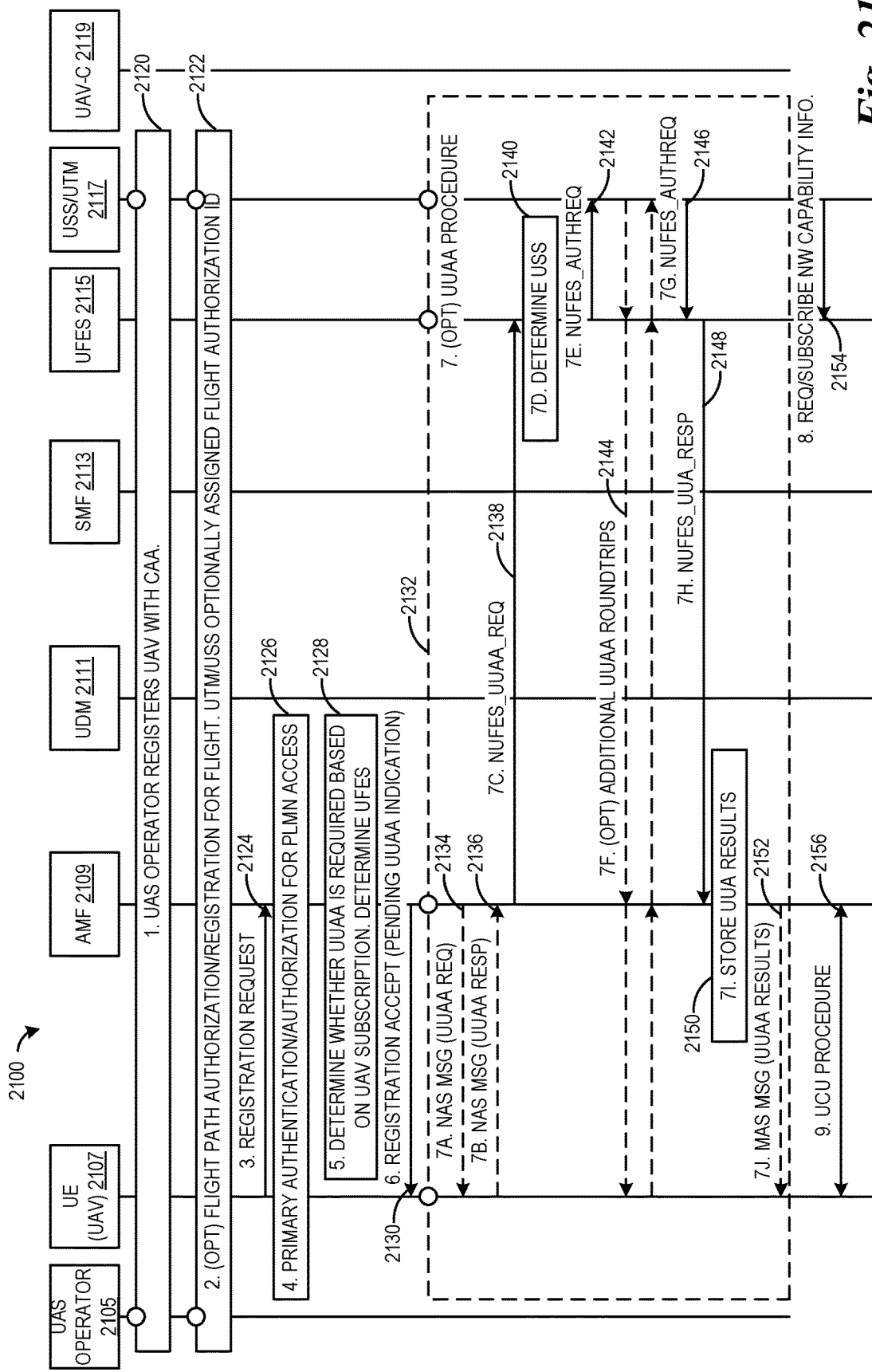
FIGS. 21A and 21B illustrate a diagram highlighting messages exchanged and processing performed in UAV authentication and authorization according to example embodiments presented herein.
Figure 21B:
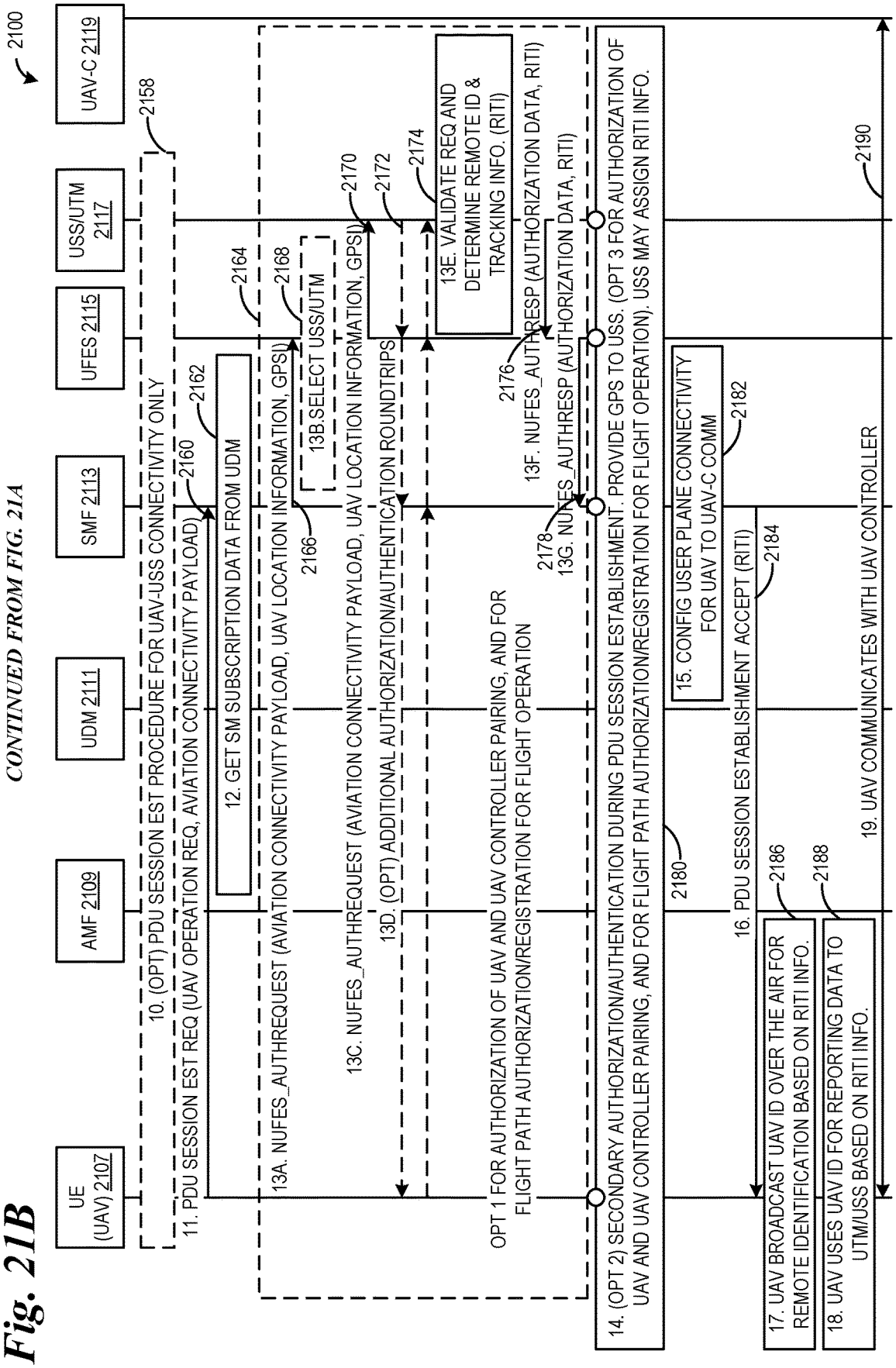

FIGS. 21A and 21B illustrate a diagram 2100 highlighting messages exchanged and processing performed in UAV authentication and authorization. The messages exchanged and processing performed involve a UAS operator 2105, a UE (UAV) 2107, an AMF 2109, a UDM 2111, a SMF 2113, a UFES 2115, a USS/UTM 2117, and a UAV-C 2119.

UAS operator 2105 registers UAV 2107 with CAA (block 2120). Furthermore, USS/UTM 2117 is informed of the registration of UAV 2107. Optionally, UAS operator 2105 requests a flight path authorization/registration for flight of UAV 2107 with USS/UTM 2117 (block 2122). UAV 2107 triggers a registration request procedure with AMF 2109 (event 2124). If UAV 2107 intends to use UAS services, UAV 2107 indicates support of UAS services.

A primary authentication/authorization process for PLMN access is performed (block 2126). AMF 2109 determines if UUAA is required (block 2128). The determination may be in accordance with the subscription of UAV 2107, for example. In addition, AMF 2109 selects UFES 2115. AMF 2109 sends a registration accept message to UAV 2107 (event 2130). The registration accept message may be pending UUAA approval.

An optional UUAA procedure is performed (dashed box 2132). The UUAA procedure includes AMF 2109 sending a NAS transport message to UAV 2107 as a UUAA request to obtain information needed for the UUAA procedure (event 2134) and receiving a NAS transport message from UAV 2107 as a UUAA response including the information needed for the UUAA procedure (event 2136). AMF 2109 requests UUAA from UFES 2115 (event 2138). AMF 2109 provides information from UAV 2107 and UAV SUPI, as well as network provided information or location information.

UFES 2115 discovers and selects USS/UTM 2117 (block 2140). UFES 2115 sends an authentication request to USS/UTM 2117 (event 2142). The authentication request includes information obtained from AMF 2109. Depending on the security mechanism utilized, multiple UUAA roundtrips may occur (events 2144).

If the authorization succeeds, USS/UTM 2117 sends UAV authorization information to UFES 2115 (event 2146). UFES 2115 notifies AMF 2109 of the result (event 2148). UFES 2115 may store the mapping between the CAA UAV ID and the 3GPP UAV ID. AMF 2109 stores the UAV authorization information in a UE context (block 2150). AMF 2109 optionally returns the results of the UUAA to UAV 2107 (block 2152).

USS/UTM 2117 optionally subscribes to or requests network capability information (event 2154). If UUAA is performed, AMF 2109 triggers a UE configuration update (UCU) procedure (event 2156).

If separate PDU sessions are to be used for UAV 2107 to USS/UTM 2117 connectivity, UAV 2107 establishes a PDU session for UAV 2107 to USS/UTM 2117 connectivity (block 2158). UAV 2107 sends a PDU session establishment request message to SMF 2113 to establish a C2 connection with a UAV-C (event 2160). SMF 21143 retrieves SM subscription data from UDM 2111 (block 2162).

An optional authorization/authentication procedure (box 2164) is performed. SMF 2113 sends a UAV operation request to UFES 2115 (event 2166). The UAV operation request includes aviation connectivity payload, UAV location information, GPSI, etc.). UFES 2115 selects a USS/UTM (e.g., USS/UTM 2117) (block 2168). UFES forwards information included in the UAV operation request to USS/UTM 2117 (event 2170). Depending on the security mechanism utilized, multiple roundtrips may occur (events 2172).

USS/UTM 2117 validates the request (block 2174). The request validation may be in accordance with the information provided in the request, for example. Furthermore, USS/UTM 2117 determines the remote ID and tracking information (RITI). USS/UTM 2117 sends a UAV operation accept to UFES 2115 (event 2176). The UAV operation accept includes authorization data and the RITI, for example. UFES 2115 sends UAV operation accept to SMF 2113 (event 2178). The UAV operation accept includes authorization data and the RITI. SMF 2113 may store association between the CAA UAV ID, 3GPP UAV ID, authorization data, and RITI.

Optionally, a secondary authorization/authentication procedure is performed during PDU session establishment (block 2180).

SMF 2113 configures user plane connectivity for UAV 2107 to UAV-C 2119 communications (block 2182). SMF 2113 sends a PDU session establishment accept including RITI (event 2184). UAV 2107 broadcasts UAV ID for remote identification based on RITI (block 2186). UAV 2107 uses UAV ID to report information to USS/UTM 2117 (block 2188). The reporting is based on RITI. UAV 2107 communicates with UAV-C 2119 using C2 connection (event 2190).

Figures 22, 23:
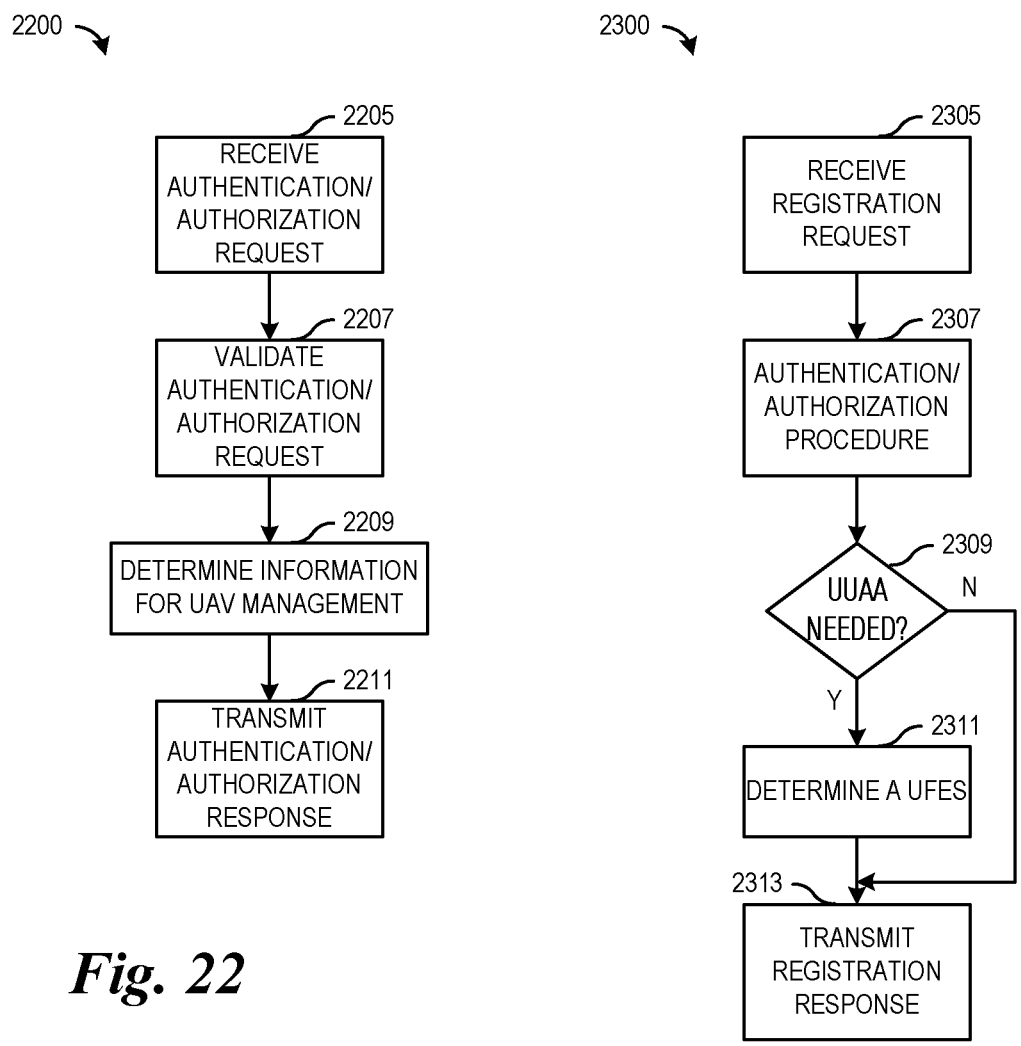
FIG. 22 illustrates a flow diagram of example operations occurring in a USS/UTM authorizing and authenticating a UAV and UAV-C pairing according to example embodiments presented herein.
FIG. 23 illustrates a flow diagram of example operations occurring in an access and mobility management function (AMF) initiating a UUAA procedure according to example embodiments presented herein.

FIG. 22 illustrates a flow diagram of example operations 2200 occurring in a USS/UTM authorizing and authenticating a UAV and UAV-C pairing. Operations 2200 may be indicative of operations occurring in a USS/UTM as the USS/UTM authorizes and authenticates a UAV and UAV-C pairing.

Operations 2200 begin with the USS/UTM receiving an authentication/authorization request (block 2205). The authentication/authorization request may be received from the UFES, for example. The authentication/authorization request includes aviation connectivity payload, UAV location information, GPSI, etc. Depending on the security mechanism being uses, multiple roundtrips may occur.

The USS/UTM validates the authentication/authorization request (block 2207). The validation of the request may be in accordance with the information provided in the authentication/authorization request. The validation of the authentication/authorization request may produce authorization data, which may include a result of the validating of the authentication-authorization request, operation policy related to a connection associated with the UAV management, UAV connection operation information in case the validating of the authentication-authorization request fails, an authorized area associated with the UAV, an authorized time associated with the UAV, communication capability and QoS requirements associated with the UAV, an indication if a UE associated with the authentication-authorization request is allowed to be used with certain UAVs, UAV connectivity behaviors usable by the mobile network, or UAV-C connectivity behaviors usable by the 3GPP network. The authorization data may have been provided to the 3GPP network during UAV authentication and authorization, or provisioned for the UAV during UAV operation.

The USS/UTM also determines information for UAV management (block 2209). The information for UAV management may include the RITI. The information for UAV management may also include a new CAA UAV ID (which may be a temporary identity for remote identification purposes) used to remotely identify the UAV, as well as authorization data that includes authorized area and time wherein the UAV can operate. The information for UAV management may also include location information associated with the UAV, other information related to the UAV in accordance with information defined in a subscription of the UAV or requested by the UTM, etc. The information for UAV management may also include information related to the UAV, including authorization status information, policy information, pairing information associated with the UAV and associated UAV-Cs, restriction information, connectivity restrictions, connectivity requirements, an assigned identity of the UAV and a UAV-C associated with the UAV, or pairing information associated with the UAV and the UAV-C associated with the UAV. Furthermore, the pairing information includes identifiers of the UAV and the UAV-C associated with the UAV or IP addresses of the UAV and the UAV-C associated with the UAV.

The USS/UTM transmits the authentication/authorization response (block 2211). The authentication/authorization response may be sent to the UFES, for example. The authentication/authorization response may include the RITI and the authorization data.

FIG. 23 illustrates a flow diagram of example operations 2300 occurring in an AMF initiating a UUAA procedure. Operations 2300 may be indicative of operations occurring in an AMF as the AMF initiates a UUAA procedure.

Operations 2300 begin with the AMF receiving a registration request (block 2305). The registration request may be received from the UAV, for example. The registration request may include an indication of support for UAS services if the UAV intends to make use of UAS services. The indication may be part of UE capabilities information. If the UAV intends to access only other services, the indication is not included. The AMF participates in an authentication/authorization procedure (block 2307).

The AMF performs a check to determine if UUAA is needed (block 2309). The determination of the need for UUAA is based on a variety of factors, including the subscription of the UAV, the UE capabilities information, as well as any UUAA information stored in the context of the UAV, for example.

If UUAA is needed, the AMF selects a UFES for the UAV (block 2311). The AMF transmits a registration response (block 2313). The registration response may include a pending UUAA indication if UUAA is needed. If UUAA is not needed, the AMF transmits a registration response (block 2313). Because UUAA is not needed, the registration response lacks the pending UUAA indication.

Figure 24:
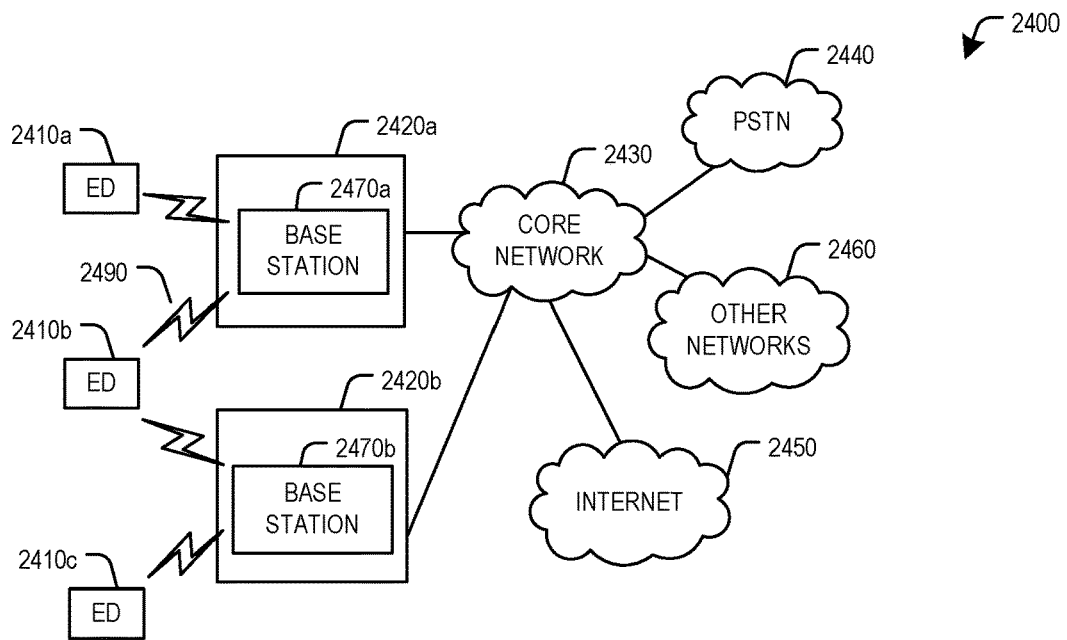
FIG. 24 illustrates an example communication system according to example embodiments presented herein.

FIG. 24 illustrates an example communication system 2400. In general, the system 2400 enables multiple wireless or wired users to transmit and receive data and other content. The system 2400 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 2400 includes electronic devices (ED) 2410a-2410c, radio access networks (RANs) 2420a-2420b, a core network 2430, a public switched telephone network (PSTN) 2440, the Internet 2450, and other networks 2460. While certain numbers of these components or elements are shown in FIG. 24, any number of these components or elements may be included in the system 2400.

The EDs 2410a-2410c are configured to operate or communicate in the system 2400. For example, the EDs 2410a-2410c are configured to transmit or receive via wireless or wired communication channels. Each ED 2410a-2410c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 2420a-2420b here include base stations 2470a-2470b, respectively. Each base station 2470a-2470b is configured to wirelessly interface with one or more of the EDs 2410a-2410c to enable access to the core network 2430, the PSTN 2440, the Internet 2450, or the other networks 2460. For example, the base stations 2470a-2470b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 2410a-2410c are configured to interface and communicate with the Internet 2450 and may access the core network 2430, the PSTN 2440, or the other networks 2460.

In the embodiment shown in FIG. 24, the base station 2470a forms part of the RAN 2420a, which may include other base stations, elements, or devices. Also, the base station 2470b forms part of the RAN 2420b, which may include other base stations, elements, or devices. Each base station 2470a-2470b operates to transmit or receive wireless signals within a particular geographic region or area, sometimes referred to as a "cell." In some embodiments, multiple-input multiple-output (MIMO) technology may be employed having multiple transceivers for each cell.

The base stations 2470a-2470b communicate with one or more of the EDs 2410a-2410c over one or more air interfaces 2490 using wireless communication links. The air interfaces 2490 may utilize any suitable radio access technology.

It is contemplated that the system 2400 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 2420a-2420b are in communication with the core network 2430 to provide the EDs 2410a-2410c with voice, data, application, Voice over Internet Protocol (VoIP), or other services. Understandably, the RANs 2420a-2420b or the core network 2430 may be in direct or indirect communication with one or more other RANs (not shown). The core network 2430 may also serve as a gateway access for other networks (such as the PSTN 2440, the Internet 2450, and the other networks 2460). In addition, some or all of the EDs 2410a-2410c may include functionality for communicating with different wireless networks over different wireless links using different wireless technologies or protocols. Instead of wireless communication (or in addition thereto), the EDs may communicate via wired communication channels to a service provider or switch (not shown), and to the Internet 2450.

Although FIG. 24 illustrates one example of a communication system, various changes may be made to FIG. 24. For example, the communication system 2400 could include any number of EDs, base stations, networks, or other components in any suitable configuration.

Figure 25A:
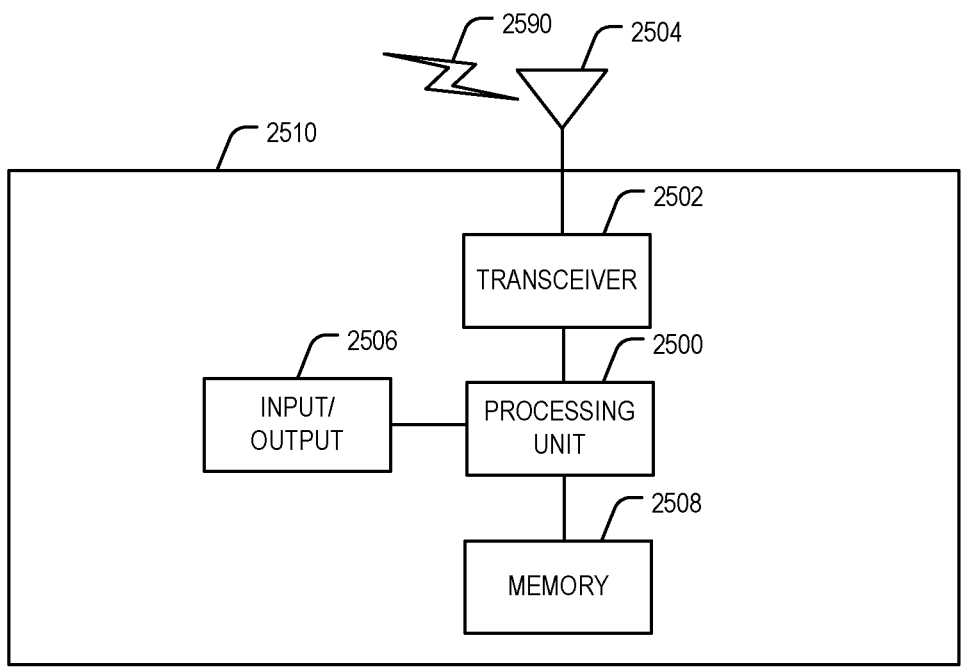
FIGS. 25A and 25B illustrate example devices that may implement the methods and teachings according to this disclosure.
Figure 25B:
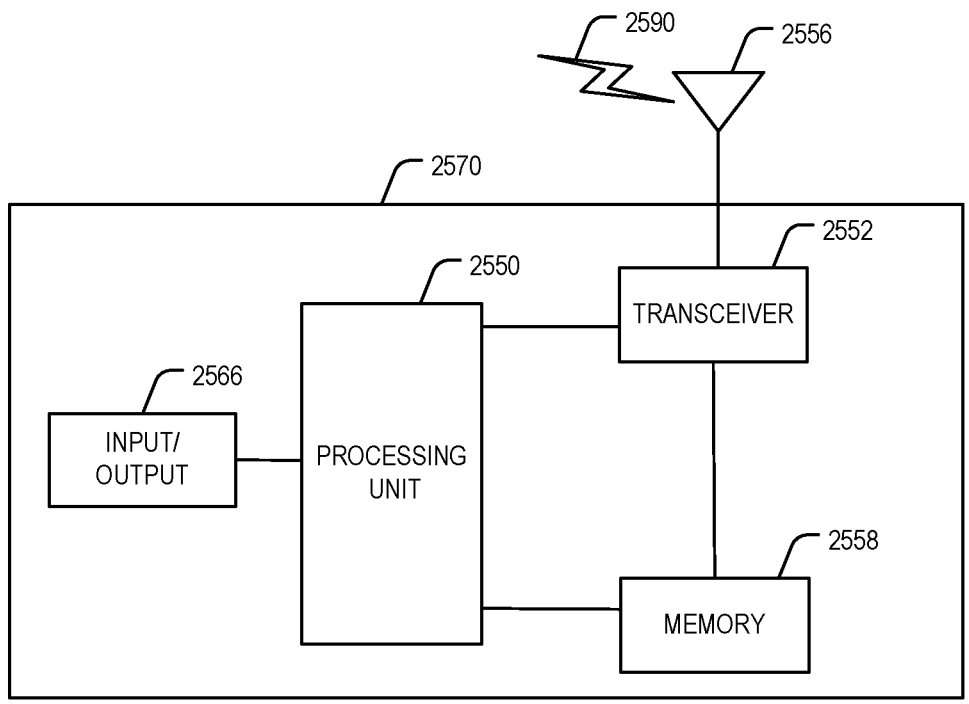

FIGS. 25A and 25B illustrate example devices that may implement the methods and teachings according to this disclosure. In particular, FIG. 25A illustrates an example ED 2510, and FIG. 25B illustrates an example base station 2570. These components could be used in the system 2400 or in any other suitable system.

As shown in FIG. 25A, the ED 2510 includes at least one processing unit 2500. The processing unit 2500 implements various processing operations of the ED 2510. For example, the processing unit 2500 could perform signal coding, data processing, power control, input/output processing, or any other functionality enabling the ED 2510 to operate in the system 2400. The processing unit 2500 also supports the methods and teachings described in more detail above. Each processing unit 2500 includes any suitable processing or computing device configured to perform one or more operations. Each processing unit 2500 could, for example, include a microprocessor, microcontroller, digital signal processor, field programmable gate array, or application specific integrated circuit.

The ED 2510 also includes at least one transceiver 2502. The transceiver 2502 is configured to modulate data or other content for transmission by at least one antenna or NIC (Network Interface Controller) 2504. The transceiver 2502 is also configured to demodulate data or other content received by the at least one antenna 2504. Each transceiver 2502 includes any suitable structure for generating signals for wireless or wired transmission or processing signals received wirelessly or by wire. Each antenna 2504 includes any suitable structure for transmitting or receiving wireless or wired signals. One or multiple transceivers 2502 could be used in the ED 2510, and one or multiple antennas 2504 could be used in the ED 2510. Although shown as a single functional unit, a transceiver 2502 could also be implemented using at least one transmitter and at least one separate receiver.

The ED 2510 further includes one or more input/output devices 2506 or interfaces (such as a wired interface to the Internet 2450). The input/output devices 2506 facilitate interaction with a user or other devices (network communications) in the network. Each input/output device 2506 includes any suitable structure for providing information to or receiving information from a user, such as a speaker, microphone, keypad, keyboard, display, or touch screen, including network interface communications.

In addition, the ED 2510 includes at least one memory 2508. The memory 2508 stores instructions and data used, generated, or collected by the ED 2510. For example, the memory 2508 could store software or firmware instructions executed by the processing unit(s) 2500 and data used to reduce or eliminate interference in incoming signals. Each memory 2508 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 25B, the base station 2570 includes at least one processing unit 2550, at least one transceiver 2552, which includes functionality for a transmitter and a receiver, one or more antennas 2556, at least one memory 2558, and one or more input/output devices or interfaces 2566. A scheduler, which would be understood by one skilled in the art, is coupled to the processing unit 2550. The scheduler could be included within or operated separately from the base station 2570. The processing unit 2550 implements various processing operations of the base station 2570, such as signal coding, data processing, power control, input/output processing, or any other functionality. The processing unit 2550 can also support the methods and teachings described in more detail above. Each processing unit 2550 includes any suitable processing or computing device configured to perform one or more operations. Each processing unit 2550 could, for example, include a microprocessor, microcontroller, digital signal processor, field programmable gate array, or application specific integrated circuit.

Each transceiver 2552 includes any suitable structure for generating signals for wireless or wired transmission to one or more EDs or other devices. Each transceiver 2552 further includes any suitable structure for processing signals received wirelessly or by wire from one or more EDs or other devices. Although shown combined as a transceiver 2552, a transmitter and a receiver could be separate components. Each antenna 2556 includes any suitable structure for transmitting or receiving wireless or wired signals. While a common antenna 2556 is shown here as being coupled to the transceiver 2552, one or more antennas 2556 could be coupled to the transceiver(s) 2552, allowing separate antennas 2556 to be coupled to the transmitter and the receiver if equipped as separate components. Each memory 2558 includes any suitable volatile or non-volatile storage and retrieval device(s). Each input/output device 2566 facilitates interaction with a user or other devices (network communications) in the network. Each input/output device 2566 includes any suitable structure for providing information to or receiving/providing information from a user, including network interface communications.

Figure 26:
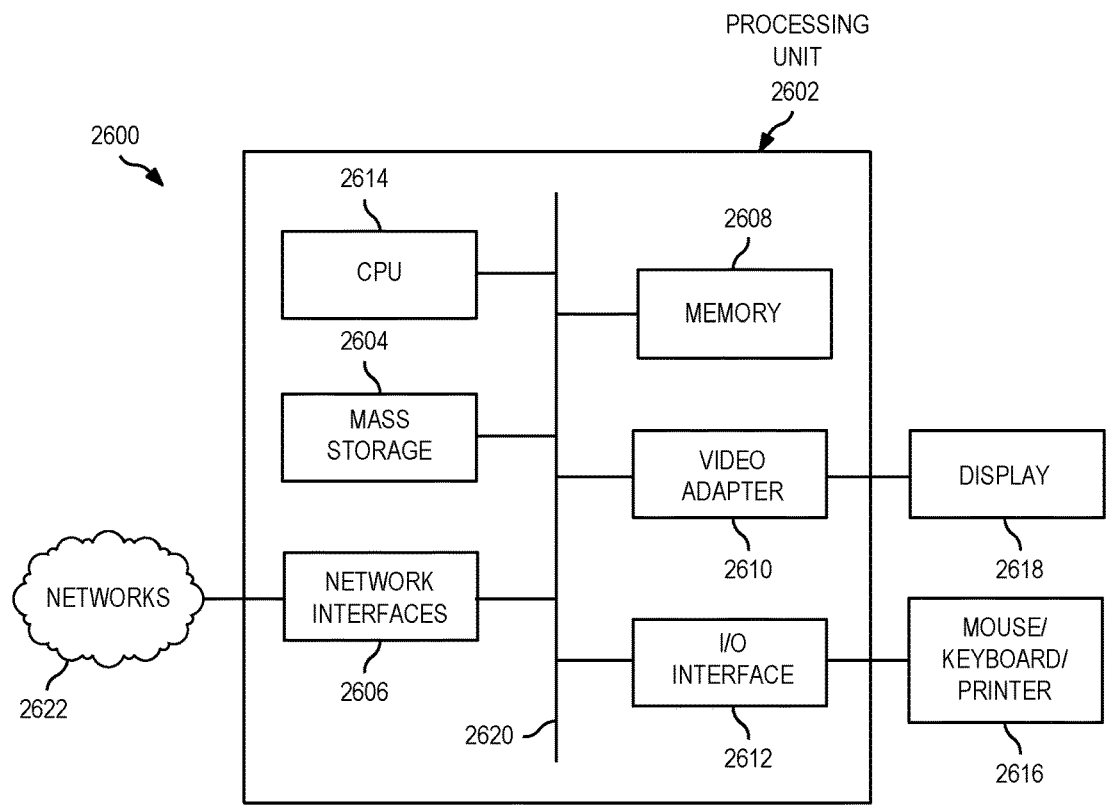
FIG. 26 is a block diagram of a computing system that may be used for implementing the devices and methods disclosed herein.

FIG. 26 is a block diagram of a computing system 2600 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 2600 includes a processing unit 2602. The processing unit includes a central processing unit (CPU) 2614, memory 2608, and may further include a mass storage device 2604, a video adapter 2610, and an I/O interface 2612 connected to a bus 2620.

The bus 2620 may be one or more of any type of several bus architectures including a memory bus or memory controller, a peripheral bus, or a video bus. The CPU 2614 may comprise any type of electronic data processor. The memory 2608 may comprise any type of non-transitory system memory such as static random access memory (SRAM), dynamic random access memory (DRAM), synchronous DRAM (SDRAM), read-only memory (ROM), or a combination thereof. In an embodiment, the memory 2608 may include ROM for use at boot-up, and DRAM for program and data storage for use while executing programs.

The mass storage 2604 may comprise any type of non-transitory storage device configured to store data, programs, and other information and to make the data, programs, and other information accessible via the bus 2620. The mass storage 2604 may comprise, for example, one or more of a solid state drive, hard disk drive, a magnetic disk drive, or an optical disk drive.

The video adapter 2610 and the I/O interface 2612 provide interfaces to couple external input and output devices to the processing unit 2602. As illustrated, examples of input and output devices include a display 2618 coupled to the video adapter 2610 and a mouse, keyboard, or printer 2616 coupled to the I/O interface 2612. Other devices may be coupled to the processing unit 2602, and additional or fewer interface cards may be utilized. For example, a serial interface such as Universal Serial Bus (USB) (not shown) may be used to provide an interface for an external device.

The processing unit 2602 also includes one or more network interfaces 2606, which may comprise wired links, such as an Ethernet cable, or wireless links to access nodes or different networks. The network interfaces 2606 allow the processing unit 2602 to communicate with remote units via the networks. For example, the network interfaces 2606 may provide wireless communication via one or more transmitters/transmit antennas and one or more receivers/receive antennas. In an embodiment, the processing unit 2602 is coupled to a local-area network 2622 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a validating unit or module, a determining unit or module, or a participating unit or module. The respective units or modules may be hardware, software, or a combination thereof. For instance, one or more of the units or modules may be an integrated circuit, such as field programmable gate arrays (FPGAs) or application-specific integrated circuits (ASICs).

Example embodiments of the invention are summarized here. Other embodiments can also be understood from the entirety of the specification as well as the claims filed herein.

Example 1: A method implemented by a mobile network management function, the method comprising: receiving, by the mobile network function from a UAV, a registration request comprising a UAS services indicator; participating, by the mobile network function, in an authentication-authorization procedure for the UAV; determining, by the mobile network function, that a UUAA is needed.

Example 2: The method of example 1, the mobile network management function comprising an AMF.

Example 3: The method of example 1, the UAS services indicator comprising at least one of indication information related to a connection type of a connection for the UAV, or aerial capabilities of the UAV.

Example 4: The method of example 2, the connection type comprising a control connection or a data connection.

Example 5: The method of example 2, the connection type comprising the UAS services indicator when the connection connects the UAV to a UAV-C or a UTM.

Example 6: The method of example 1, determining that the UUAA is needed being in accordance with a subscription of the UAV and capabilities of the UAV.

Example 7: The method of any one of examples 1-6, the UAS services indicator indicating usage of UAS services by UAV.

Example 8: The method of example 7, the registration request further including a UAV identity.

Although the present disclosure and its advantages have been described in detail, it should be understood that various changes, substitutions and alterations can be made herein without departing from the scope of the disclosure as defined by the appended claims.

What is claimed is:

1. A method comprising:
receiving, by an unmanned aerial system (UAS) traffic management (UTM) from a mobile network function providing UAS management support functionality, an authentication-authorization request including additional UAS management information associated with an unmanned aerial vehicle (UAV), the additional UAS management information including an aviation connectivity payload;
validating, by the UTM, the authentication-authorization request based on the additional UAS management information thereby producing authorization data associated with the UAV, the authorization data associated with the UAV including communication capability and quality of service (QOS) requirements associated with the UAV, the authorization data associated with the UAV further including UAV connectivity behaviors usable by the mobile network function;
determining, by the UTM, information for UAV management including remote identification and tracking information (RITI), location information associated with the UAV, and pairing information associated with the UAV and a UAV controller (UAV-C) associated with the UAV, the pairing information comprising Internet protocol (IP) addresses of the UAV and the UAV-C associated with the UAV; and
transmitting, by the UTM to the mobile network function, an authentication-authorization response including the authorization data associated with the UAV and the information for the UAV management.

2. The method of claim 1, the mobile network function being implemented in one of an existing mobile network function or a new mobile network function, to provide management support for an UAS.

3. The method of claim 2, the existing mobile network function comprising one of an access management function (AMF) or a session management function (SMF).

4. The method of claim 2, the new mobile network function comprising a UAV flight enablement subsystem (UFES).

5. The method of claim 1, the information for the UAV management further comprising other information related to the UAV in accordance with information defined in a subscription of the UAV or requested by the UTM.

6. The method of claim 5, the other information related to the UAV being provided by a mobile network.

7. The method of claim 5, the other information related to the UAV comprising at least one of authorization status information, policy information, pairing information associated with the UAV and associated UAV-Cs, restriction information, connectivity restrictions, or connectivity requirements.

8. The method of claim 6, the authorization data associated with the UAV further comprising at least one of a result of the validating of the authentication-authorization request, an operation policy related to a connection associated with the UAV management, UAV connection operation information in case the validating of the authentication-authorization request fails, an authorized area associated with the UAV, an authorized time associated with the UAV, an indication if a user equipment (UE) associated with the authentication-authorization request is allowed to be used with certain UAVs, UAV or UAV-C connectivity behaviors usable by the mobile network function.

9. The method of claim 1, the information for the UAV management further comprising an assigned identity of the UAV and an identity of the UAV-C associated with the UAV.

10. The method of claim 1, the pairing information further comprising identifiers of the UAV and the UAV-C associated with the UAV.

11. The method of claim 6, the authorization data associated with the UAV and the information for the UAV management being provided to the mobile network during UAV authentication and authorization, or provisioned for the UAV during UAV operation.

12. An unmanned aerial system (UAS) traffic management (UTM), the UTM comprising:
one or more processors; and
a non-transitory memory storage comprising instructions that, when executed by the one or more processors, cause the UTM to:
receive, from a mobile network function providing UAS management support functionality, an authentication-authorization request including additional UAS management information associated with an unmanned aerial vehicle (UAV), the additional UAS management information including an aviation connectivity payload;
validate the authentication-authorization request based on the additional UAS management information thereby producing authorization data associated with the UAV, the authorization data associated with the UAV including communication capability and quality of service (QOS) requirements associated with the UAV, the authorization data associated with the UAV further including UAV connectivity behaviors usable by the mobile network function;
determine information for UAV management including remote identification and tracking information (RITI), location information associated with the UAV, and pairing information associated with the UAV and a UAV controller (UAV-C) associated with the UAV, the pairing information comprising Internet protocol (IP) addresses of the UAV and the UAV-C associated with the UAV; and
transmit, to the mobile network function, an authentication-authorization response including the authorization data associated with the UAV and the information for the UAV management.

13. The UTM of claim 12, the information for the UAV management further comprising other information related to the UAV in accordance with information defined in a subscription of the UAV or requested by the UTM.

14. The UTM of claim 13, the other information related to the UAV comprising at least one of authorization status information, policy information, pairing information associated with the UAV and associated UAV-Cs, restriction information, connectivity restrictions, or connectivity requirements.

15. The UTM of claim 12, the authorization data associated with the UAV further comprising at least one of a result of authentication-authorization request validation, an operation policy related to a connection associated with the UAV management, UAV connection operation information in case the authentication-authorization request validation fails, an authorized area associated with the UAV, an authorized time associated with the UAV, an indication if a user equipment (UE) associated with the authentication-authorization request is allowed to be used with certain UAVs, or UAV-C connectivity behaviors usable by the mobile network function.

16. The UTM of claim 12, the information for the UAV management further comprising an assigned identity of the UAV and an identity of the UAV-C associated with the UAV.

17. The UTM of claim 15, the authorization data associated with the UAV and the information for the UAV management being provided to the mobile network function during UAV authentication and authorization, or provisioned for the UAV during UAV operation.

18. A non-transitory computer-readable medium having instructions stored thereon that, when executed by an unmanned aerial system (UAS) traffic management (UTM), cause the UTM to perform operations, the operations comprising:
receiving, from a mobile network function providing UAS management support functionality, an authentication-authorization request including additional UAS management information associated with an unmanned aerial vehicle (UAV), the additional UAS management information including an aviation connectivity payload;
validating the authentication-authorization request based on the additional UAS management information thereby producing authorization data associated with the UAV, the authorization data associated with the UAV including communication capability and quality of service (QOS) requirements associated with the UAV, the authorization data associated with the UAV further including UAV connectivity behaviors usable by the mobile network function;
determining information for UAV management including remote identification and tracking information (RITI), location information associated with the UAV, and pairing information associated with the UAV and a UAV controller (UAV-C) associated with the UAV, the pairing information comprising Internet protocol (IP) addresses of the UAV and the UAV-C associated with the UAV; and
transmitting, to the mobile network function, an authentication-authorization response including the authorization data associated with the UAV and the information for the UAV management.

* * * * *